United States Patent
Kubono et al.

(10) Patent No.: US 8,421,272 B2
(45) Date of Patent: Apr. 16, 2013

(54) TRANSMISSION SYSTEM, POWER SUPPLYING APPARATUS, POWER RECEIVING APPARATUS, AND TRANSMISSION METHOD

(75) Inventors: Fumio Kubono, Tokyo (JP); Yoshihito Ishibashi, Tokyo (JP); Shoji Nagai, Tokyo (JP); Yuko Yoshida, Tokyo (JP); Naoki Ide, Tokyo (JP)

(73) Assignee: Sony Corporation, Tokyo (JP)

( * ) Notice: Subject to any disclaimer, the term of this patent is extended or adjusted under 35 U.S.C. 154(b) by 884 days.

(21) Appl. No.: 12/480,145

(22) Filed: Jun. 8, 2009

(65) Prior Publication Data

US 2009/0302690 A1  Dec. 10, 2009

(30) Foreign Application Priority Data

Jun. 9, 2008 (JP) ................ P2008-150911

(51) Int. Cl.
*H02J 17/00* (2006.01)
(52) U.S. Cl.
USPC ......................................................... 307/104
(58) Field of Classification Search ............ 307/104; 320/108
See application file for complete search history.

(56) References Cited

U.S. PATENT DOCUMENTS

| | | | | |
|---|---|---|---|---|
| 3,573,684 A * | 4/1971 | Dickinson | .................... | 334/15 |
| 4,349,746 A * | 9/1982 | Grossner et al. | ............. | 307/106 |
| 5,337,063 A * | 8/1994 | Takahira | .................... | 343/741 |
| 5,455,467 A * | 10/1995 | Young et al. | .................. | 307/104 |
| 5,594,316 A * | 1/1997 | Hayashida | ........................ | 49/31 |
| 5,854,481 A * | 12/1998 | Ricotti et al. | ................. | 235/492 |
| 6,173,899 B1 * | 1/2001 | Rozin | ........................... | 235/492 |
| 6,218,942 B1 | 4/2001 | Vega et al. | | |
| 2005/0007067 A1 * | 1/2005 | Baarman et al. | ............. | 320/108 |
| 2006/0176015 A1 * | 8/2006 | Bersenev | ....................... | 320/114 |

FOREIGN PATENT DOCUMENTS

| | | |
|---|---|---|
| JP | 7-94928 | 4/1995 |
| JP | 11-51358 | 11/1999 |
| JP | 2005-79786 | 3/2005 |
| JP | 2008-21176 | 1/2008 |
| WO | WO 9714112 A1 * | 4/1997 |

* cited by examiner

*Primary Examiner* — Fritz M Fleming
(74) *Attorney, Agent, or Firm* — Finnegan, Henderson, Farabow, Garrett & Dunner, LLP.

(57) ABSTRACT

There is provided a transmission system, including a power supplying apparatus that includes an AC signal generation unit that generates an AC signal, a first resonance unit that has an induction component and/or a capacitance component and resonates the AC signal generated by the AC signal generation unit, and a power supplying electrode that externally radiates the resonated AC signal as a potential difference in an electrostatic field, and a power receiving apparatus that includes a power receiving electrode that generates an electric signal by sensing the potential difference in the electrostatic field, a second resonance unit that has an induction component and/or a capacitance component and resonates the electric signal generated by the power receiving electrode, and a rectification unit that rectifies the resonated electric signal.

12 Claims, 27 Drawing Sheets

FIG.17
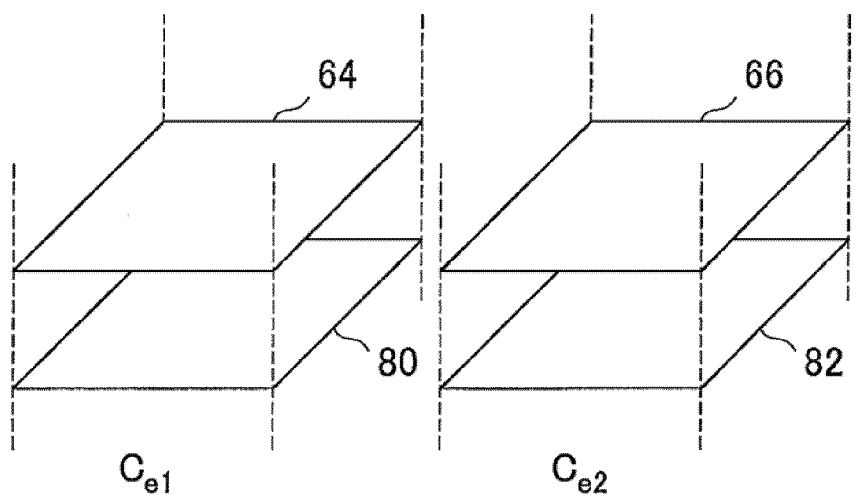
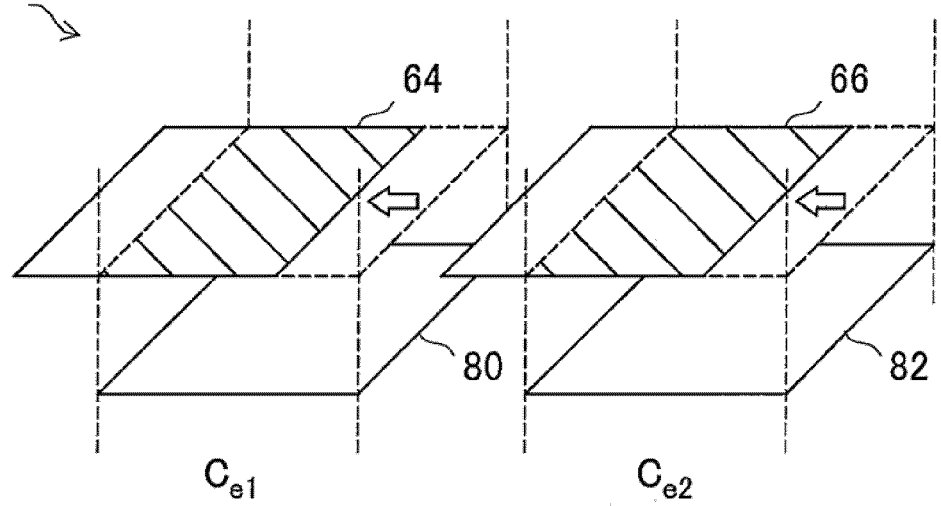

TRANSMISSION SYSTEM, POWER SUPPLYING APPARATUS, POWER RECEIVING APPARATUS, AND TRANSMISSION METHOD

BACKGROUND OF THE INVENTION

1. Field of the Invention

The present invention relates to a transmission system, a power supplying apparatus, a power receiving apparatus, and a transmission method.

2. Description of the Related Art

Technologies using a magnetic field or radio wave have been developed as technologies to transmit power in a non-contact manner. According to such power transmission technologies using a magnetic field or radio wave, power can be transmitted from a power supplying apparatus to a power receiving apparatus without needing an electric line or the like. Japanese Patent Application Laid-Open No. 2008-21176, for example, discloses an information display apparatus capable of receiving power transmitted by using electromagnetic waves and applicable to a non-contact IC card.

A technique to transmit power using a magnetic field or radio wave will be described below using FIG. 1 and FIG. 2.

FIG. 1 shows an example of the configuration of a transmission system 10 to transmit power using a magnetic field. Referring to FIG. 1, the transmission system 10 includes an AC signal generation unit 12, a primary coil 14, a secondary coil 16, and a circuit load 18.

In the transmission system 10, power is transmitted from the primary coil 14 to the secondary coil 16 by generating an electromotive force based on the law of electromagnetic induction of Faraday. In FIG. 1, if an AC signal is provided from the AC signal generation unit 12 to the primary coil 14, a magnetic flux φ changing with time is generated inside the coil. An electromotive force V corresponding to a change with time of the magnetic flux φ can be obtained by letting the magnetic flux pass through the secondary coil 16. The electromotive force V is given by Formula (1).

[Math 1]

$$V = -\frac{d\phi}{dt} \ [V] \quad (1)$$

The electromotive force V in Formula (1) is supplied to the circuit load 18.

Next, FIG. 2 shows an example of the configuration of a transmission system 20 to transmit power using a radio wave. Referring to 2a of FIG. 2, the transmission system 20 includes a power supplying circuit 22, a power supplying antenna 24, a power receiving antenna 26, and a power receiving circuit 28. The receiving circuit 28 has a resonance circuit 30, a rectifier circuit 32, and a circuit load 34.

In FIG. 2, a radio wave is emitted with radiation power P from the power supplying antenna 24 of the power supplying circuit 22 to the space. An electric field E [V/m] at a point of the power receiving antenna 26 at a distance d [m] from the power supplying antenna 24 is given by the following formula:

[Math 2]

$$E = k\frac{\sqrt{P}}{d} \ [V/m] \quad (2)$$

Here, k is a constant determined by characteristics of the power supplying antenna 24 and the power receiving antenna 26. The power receiving antenna 26 and the resonance circuit 30 can be represented by an equivalent circuit shown in 2b of FIG. 2. R in 2b is a radiation resistance of the power receiving antenna 26 and $h_e$ is an effective height of the power receiving antenna 26. Effective power $P_r$ of the power receiving circuit 28 is given by the following formula:

[Math 3]

$$P_r = \frac{E^2 h_e^2}{4R} \ [W] \quad (3)$$

Here, if the resonance circuit 30 and the radiation resistance R are matched, a voltage V generated in the resonance circuit 30 is given by the following formula:

[Math 4]

$$V = \frac{E \cdot h_e}{2} \ [V] \quad (4)$$

SUMMARY OF THE INVENTION

However, if power is attempted to transmit by using, for example, a magnetic field, the magnitude of a magnetic flux passing through the coil directly affects the electromotive force and thus, it is difficult to eliminate constraints on spatial relationships between a power supplying apparatus and a power receiving apparatus. Moreover, if power is attempted to transmit by using, for example, a radio wave, it becomes necessary to use a radio wave of higher frequency that consumes power with a decreasing size of an antenna and thus, utilization efficiency of energy declines.

Thus, there is a need for a novel and improved transmission system, a power supplying apparatus, a power receiving apparatus, and a transmission method capable of efficiently transmit power by relaxing constraints on spatial relationships and using an electrostatic field.

According to an embodiment of the present invention, there is provided a transmission system, including a power supplying apparatus that includes an AC signal generation unit that generates an AC signal, a first resonance unit that has an induction component and/or a capacitance component and resonates the AC signal generated by the AC signal generation unit, and a power supplying electrode that externally radiates the resonated AC signal as a potential difference in an electrostatic field, and a power receiving apparatus that includes a power receiving electrode that generates an electric signal by sensing the potential difference in the electrostatic field, a second resonance unit that has an induction component and/or a capacitance component and resonates the electric signal generated by the power receiving electrode, and a rectification unit that rectifies the resonated electric signal.

According to the above configuration, the AC signal generation unit generates an AC signal, and the generated AC signal is resonated by an induction component and/or a capacitance component of a resonance circuit formed by the first resonance unit of the power supplying apparatus and the second resonance unit of the power receiving apparatus. The resonated AC signal is radiated as a potential difference in an electrostatic field from the power supplying electrode and sensed as a potential difference in an electrostatic field by the power receiving electrode. Then, the power receiving electrode generates an electric signal from the sensed potential difference, and the generated electric signal is rectified by the rectification unit.

The power receiving apparatus may further include a power measurement unit that measures a power value of power generated after the electric signal rectified by the rectification unit and a control unit that controls the induction component and/or the capacitance component of the second resonance unit based on the power value measured by the power measurement unit.

The control unit may control the capacitance component of the second resonance unit by changing a voltage applied to a varactor element held by the second resonance unit.

The control unit may control the induction component of the second resonance unit by moving a control member gripped so as to at least partially go through an inner position of a coil.

The power supplying apparatus may further include a power measurement unit that measures a power value of power supplied from the power supplying apparatus and a control unit that controls the induction component and/or the capacitance component of the first resonance unit based on the power value measured by the power measurement unit.

The control unit may control the capacitance component of the first resonance unit by changing a voltage applied to a varactor element held by the first resonance unit.

The control unit may control the induction component of the first resonance unit by moving a control member gripped so as to at least partially go through an inner position of a coil.

The power supplying apparatus may further include a power measurement unit that measures a power value of power supplied from the power supplying apparatus and a control unit that controls an angular frequency of an AC signal generated by the AC signal generation unit based on the power value measured by the power measurement unit.

The control unit may lower output of the AC signal generated by the AC signal generation unit when the power value measured by the power measurement unit is smaller than a predetermined threshold.

The power supplying electrode and the power receiving electrode may have different sizes.

The power receiving electrode may include a plurality of electrodes, and the power receiving apparatus may further include a first selection unit and a second selection unit each capable of selecting designated electrodes from the plurality of electrodes and a selection determination unit that classifies the plurality of electrodes into a first set and a second set based on signal intensity of an electric signal output from each of the plurality of electrodes, instructs the first selection unit to make a selection of electrodes belonging to the first set, and instructs the second selection unit to make a selection of electrodes belonging to the second set.

The power receiving apparatus may further include a power measurement unit that measures a power value of power generated after the electric signal rectified by the rectification unit and a first communication unit that transmits the power value measured by the power measurement unit with a radio signal via the power receiving electrode, and the power supplying apparatus may further include a second communication unit that receives the power value transmitted from the power receiving apparatus via the power supplying electrode and a control unit that controls an angular frequency of an AC signal generated by the AC signal generation unit based on the power value received by the second communication unit.

The power receiving apparatus may further include a first communication unit that performs radio communication with the power supplying apparatus via the power receiving electrode, a secondary power supply unit connected to the first communication unit, a power measurement unit that measures a power value of power generated after the electric signal rectified by the rectification unit, and a power supply selection unit that causes the rectification unit to supply power to the first communication unit when the power value measured by the power measurement unit is larger than a predetermined threshold and that causes the secondary power supply unit to supply power to the first communication unit when the power value measured by the power measurement unit is smaller than the predetermined threshold.

According to another embodiment of the present invention, there is provided a power supplying apparatus, including an AC signal generation unit that generates an AC signal, a resonance unit that has an induction component and/or a capacitance component and resonates the AC signal generated by the AC signal generation unit, and a power supplying electrode that externally radiates the resonated AC signal as a potential difference in an electrostatic field.

According to another embodiment of the present invention, there is provided a power receiving apparatus, including a power receiving electrode that generates an electric signal by sensing a potential difference in an electrostatic field, a resonance unit that has an induction component and/or a capacitance component and resonates the electric signal generated by the power receiving electrode, and a rectification unit that rectifies the resonated electric signal.

According to another embodiment of the present invention, there is provided a transmission method, including the steps of: generating an AC signal; resonating the generated AC signal by an induction component and/or a capacitance component of a resonance circuit formed by a resonance unit of a power supplying apparatus and a resonance unit of a power receiving apparatus; radiating the resonated AC signal from the power supplying apparatus as a potential difference in an electrostatic field; generating an electric signal by sensing the potential difference in the electrostatic field in the power receiving apparatus; and rectifying the generated electric signal.

According to a transmission system, a power supplying apparatus, a power receiving apparatus, and a transmission method, as described above, constraints on special relationships are relaxed, and power can efficiently be transmitted by using an electrostatic field.

BRIEF DESCRIPTION OF THE DRAWINGS

FIG. 17 is a schematic diagram conceptually showing a spatial relationship between a power supplying electrode and a power receiving electrode;

DETAILED DESCRIPTION OF THE PREFERRED EMBODIMENTS

Figure 1:
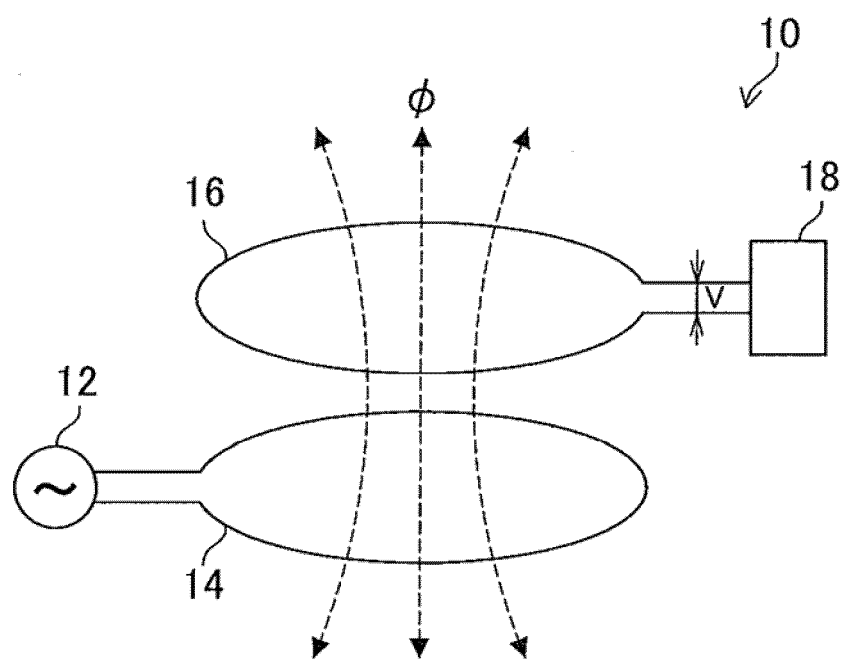
FIG. 1 is a schematic diagram exemplifying a transmission system to transmit power using a magnetic field.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[1] Technical Issues in Related Technologies

First, technical issues in related technologies to transmit power using a magnetic field or radio wave will be described again using FIG. 3 to FIG. 5.

Figure 3:
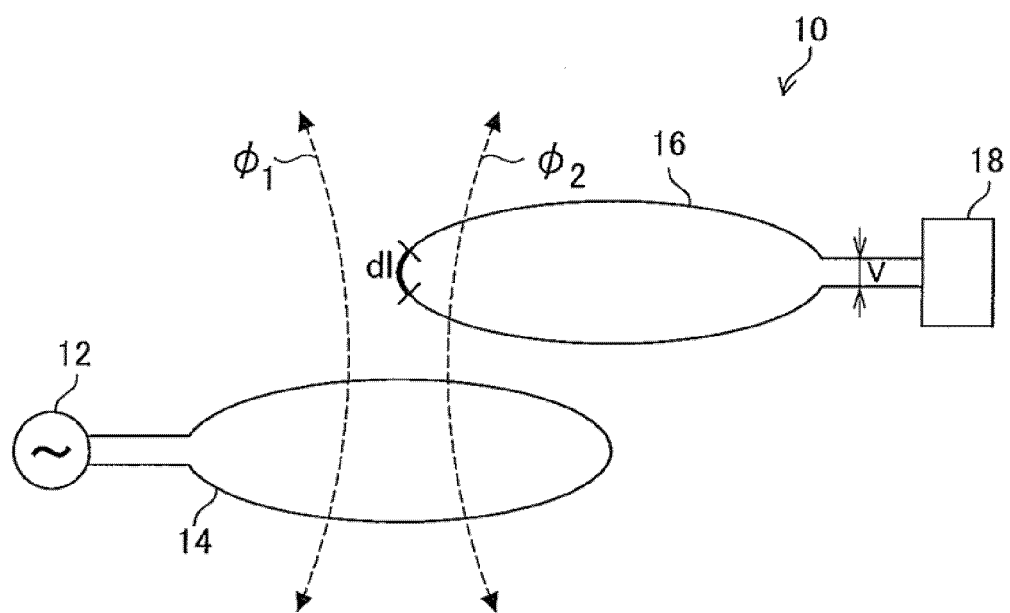
FIG. 3 is a schematic diagram illustrating constraints on positions of the transmission system to transmit power using a magnetic field.

FIG. 3 shows a situation in which the center position of the primary coil 14 and that of the secondary coil 16 are shifted out of the alignment in the transmission system 10 shown in FIG. 1.

In FIG. 3, a magnetic flux $\phi_1$ and a magnetic flux $\phi_2$ generated by an AC signal supplied from the AC signal generation unit 12 to the primary coil 14 are oriented in directions in which the magnetic flux $\phi_1$ and the magnetic flux $\phi_2$ cancel out each other due to a shift of the two coils on the basis of an infinitesimal length d1 on the secondary coil 16. Thus, no electromotive force is generated in the infinitesimal length d1 of the secondary coil 16 in the condition shown in FIG. 3.

Therefore, when a magnetic field system in which power is transmitted using a magnetic field is adopted, it is necessary to use a power supplying apparatus and a power receiving apparatus by optimally arranging the power supplying apparatus and the power receiving apparatus so as to satisfy constraints of the spatial relationship thereof.

Figure 4:
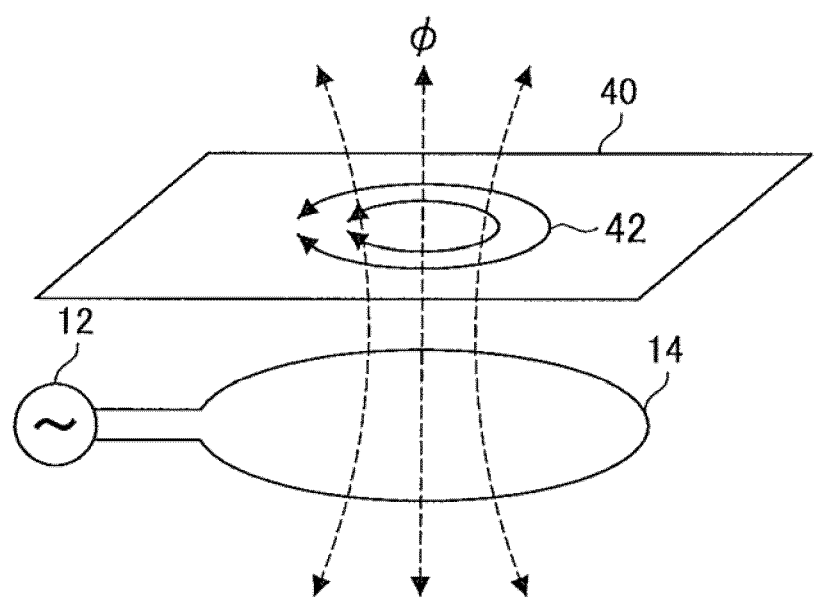
FIG. 4 is a schematic diagram exemplifying an eddy current generated by the transmission system to transmit power using a magnetic field.

Moreover, when a magnetic flux system is used, as shown in FIG. 4, if a conductor 40 is placed near the primary coil 14 on the power supplying side, an eddy current 42 is generated in the conductor due to a magnetic field $\phi$ originating from the primary coil 14. If the magnetic field $\phi$ originating from the primary coil 14 is strong, there is a possibility of danger such as burns being posed to the user due to heat produced by the eddy current 42.

In addition, while FIG. 1 and FIG. 3 show that the number of times of winding the conductor wire to construct a coil is one, a large number of times of winding are actually necessary to obtain a sufficient electromotive force, demanding a certain amount of costs.

Figure 2:
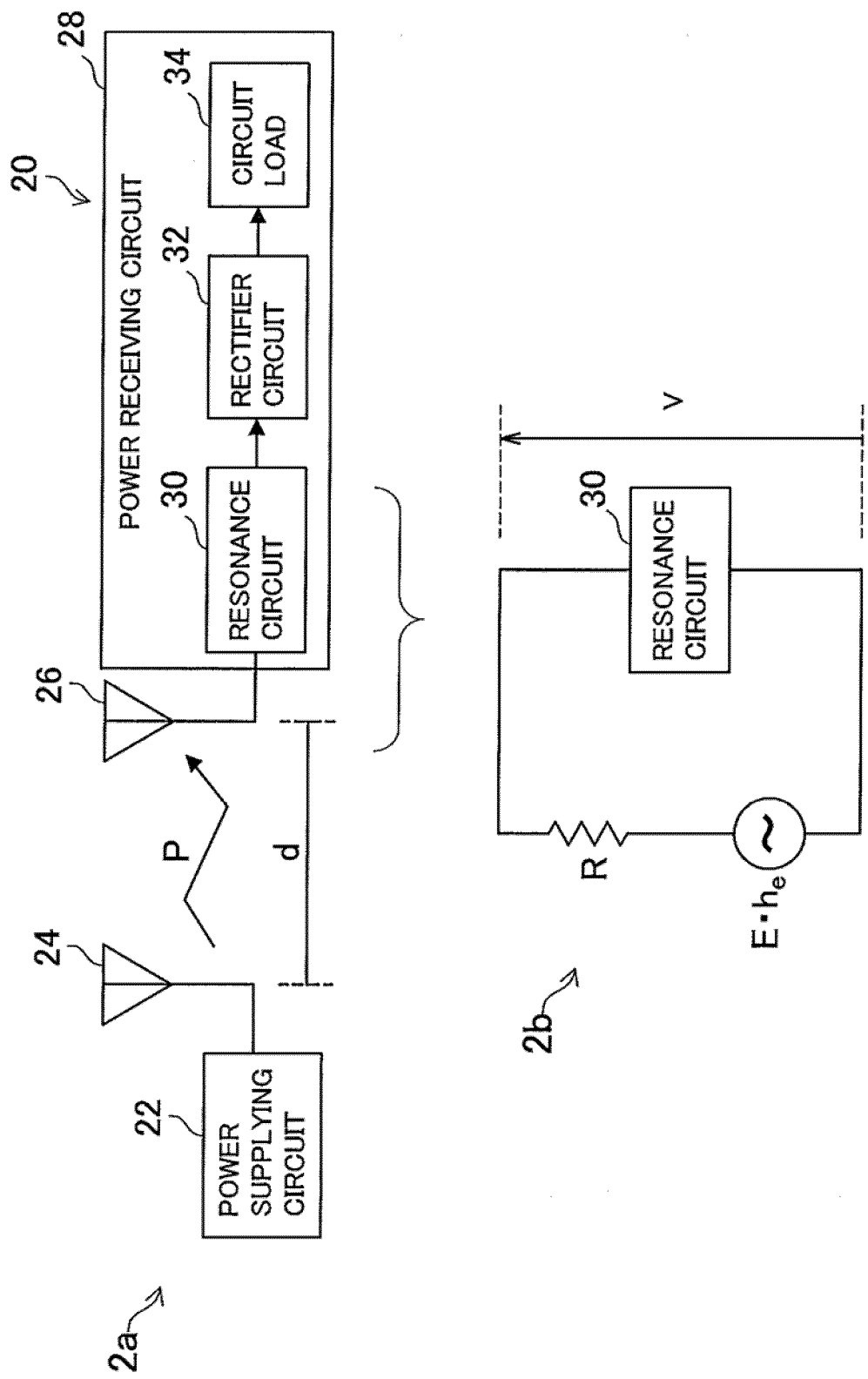
FIG. 2 is a schematic diagram exemplifying a transmission system to transmit power using a radio wave.
Figure 5:
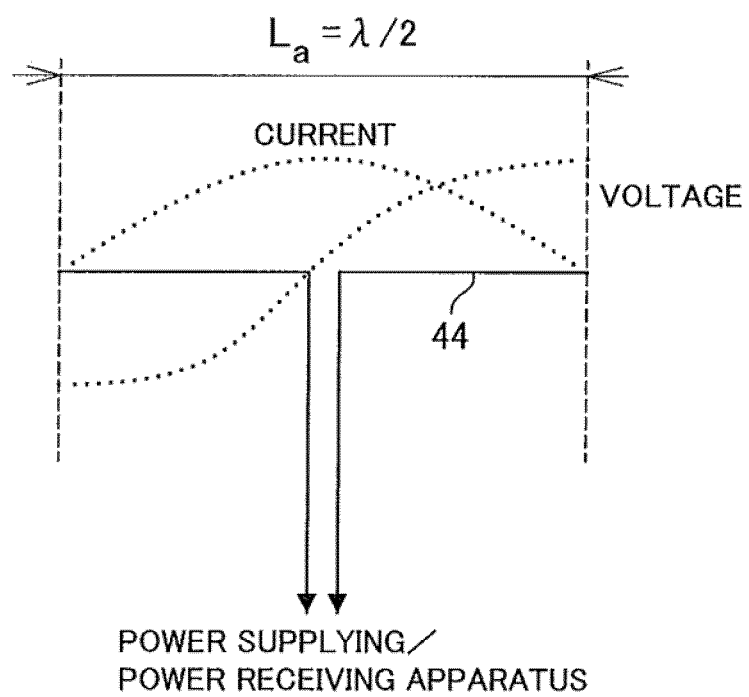
FIG. 5 is an explanatory view showing a relation between an antenna and wavelength in the transmission system to transmit power using a radio wave.

FIG. 5 is a schematic diagram showing a situation in which the power supplying antenna 24 and the power receiving antenna 26 in the transmission system 20 shown in FIG. 2 are constructed as a half-wave dipole antenna 44.

When a radio wave system in which power is transmitted using a radio wave is adopted, the relation between efficiency of antennas and the frequency of carriers poses an issue. In order to efficiently radiate a radio wave from an antenna or to efficiently receive a radiated radio wave, it is necessary to set an antenna length $L_a$ with respect to the frequency $\lambda$ of carriers as $\lambda/2$ to form a standing wave in the antenna.

Thus, if the antenna length $L_a$ is set, for example, at $L_a=\lambda/2=5$ [cm] in consideration of recent miniaturization of electronic devices, the resonance frequency f is derived by the following formula:

[Math 5]

$$f = \frac{c}{\lambda} = \frac{3 \times 10^8 \text{ [m/sec]}}{5 \text{ [cm]} \times 2} = 3 \text{ [GHz]} \tag{5}$$

That is, if an antenna has a length of about 5 [cm], it is necessary to use a frequency of as high as 3 [GHz] as carriers to cause the antenna to function more efficiently by resonance. As a result, power consumption by the circuit increases and utilization efficiency of energy declines. Moreover, it becomes more difficult to design a high frequency circuit with an increasing frequency, necessitating adjustments of the circuit using a real system.

While, as described above, there are some issues in related technologies to transmit power using a magnetic field or radio wave, power can be transmitted more efficiently with a technique using an electrostatic field according to an embodiment of the present invention described below.

[2] Basic Principle of Power Transmission Using an Electrostatic Field

First, the basic principle of power transmission using an electrostatic field will be described using FIG. 6 to FIG. 10. The description below becomes a basis for the first to sixth embodiments of the present invention described below.

Figure 6:
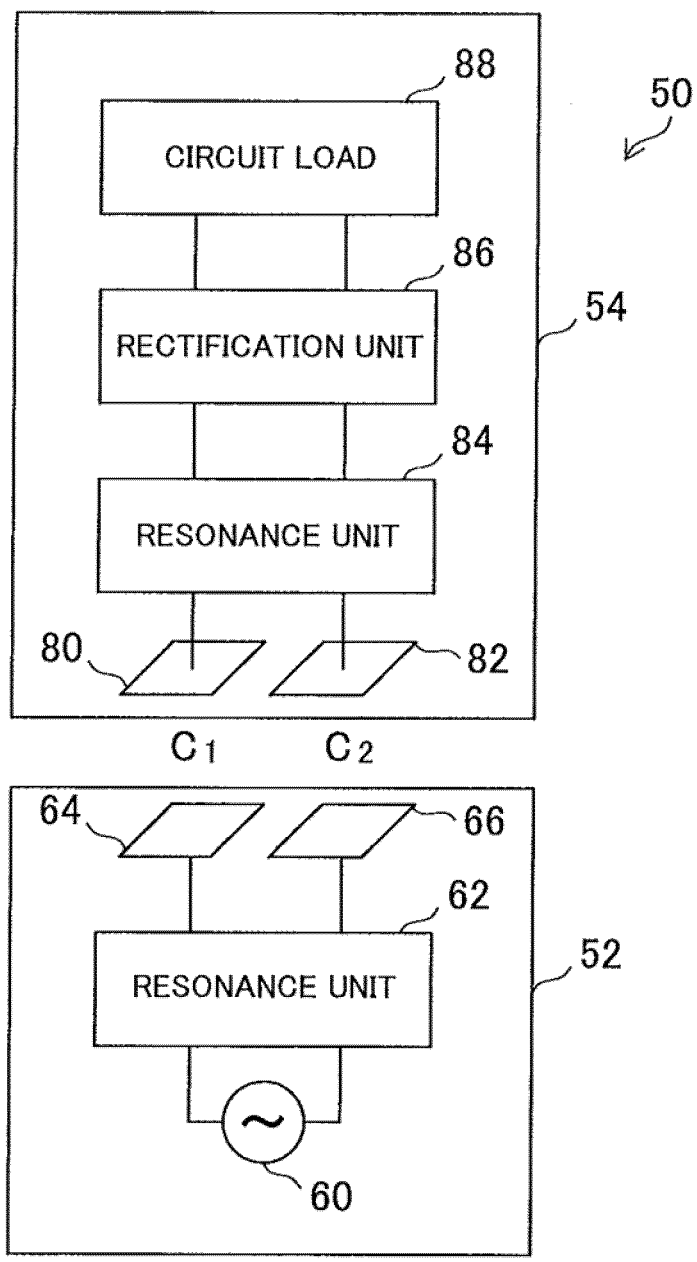
FIG. 6 is a block diagram exemplifying a basic configuration of a transmission system according to an embodiment of the present invention.

FIG. 6 is a block diagram exemplifying a basic configuration of a transmission system 50 to transmit power using an electrostatic field.

Referring to FIG. 6, the transmission system 50 includes a power supplying apparatus 52 and a power receiving apparatus 54. The power supplying apparatus 52 has an AC signal generation unit 60, a resonance unit 62, a first power supplying electrode 64, and a second power supplying electrode 66. The power receiving apparatus 54 has a first power receiving electrode 80, a second power receiving electrode 82, a resonance unit 84, a rectification unit 86, and a circuit load 88.

In the power supplying apparatus 52, the AC signal generation unit 60 and the resonance unit 62 are connected. The resonance unit 62 is connected to the first power supplying electrode 64 and the second power supplying electrode 66 that are arranged in parallel.

The AC signal generation unit 60 generates an AC signal to be a power source for transmission and sends out the AC signal to the resonance unit 62. The resonance unit 62 relays the sent AC signal to the first power supplying electrode 64 and the second power supplying electrode 66. Then, the first power supplying electrode 64 and the second power supplying electrode 66 radiate the AC signal to the outside as a potential difference in an electrostatic field.

In the power receiving apparatus 54, the first power receiving electrode 80 and the second power receiving electrode 82 are each connected to the resonance unit 84. The resonance unit 84 is connected to the rectification unit 86. The rectification unit 86 is connected to the circuit load 88.

While the first power receiving electrode 80 is arranged opposite to the first power supplying electrode 64 and the second power receiving electrode 82 opposite to the second power supplying electrode 66 in FIG. 6, each electrode may not be arranged strictly opposite to each other in each embodiment of the present invention described later.

The first power receiving electrode 80 and the second power receiving electrode 82 generate an electric signal by sensing a potential difference in an electrostatic field and output the generated electric signal to the resonance unit 84. The resonance unit 84 relays the electric signal output from the first power receiving electrode 80 or the second power receiving electrode 82 to the rectification unit 86. Then, the rectification unit 86 converts the relayed electric signal into a DC signal to generate DC power and supplies the generated DC power to the circuit load 88.

In the transmission system 50 shown in FIG. 6, the resonance unit 62 of the power supplying apparatus 52 and the resonance unit 84 of the power receiving apparatus 54 are constructed so that resonance conditions are satisfied in the system as a whole. Resonance in the transmission system 50 will be described in detail later.

Here, the power supplying electrodes and the power receiving electrodes are each formed typically from material having conductivity. More specifically, a conductor such as copper, gold, and silver or a compound thereof can be used for each electrode. When such electrodes having conductivity are arranged in positions so that electrostatic coupling occurs, an electrostatic capacity is generated between the electrodes.

Figure 7:
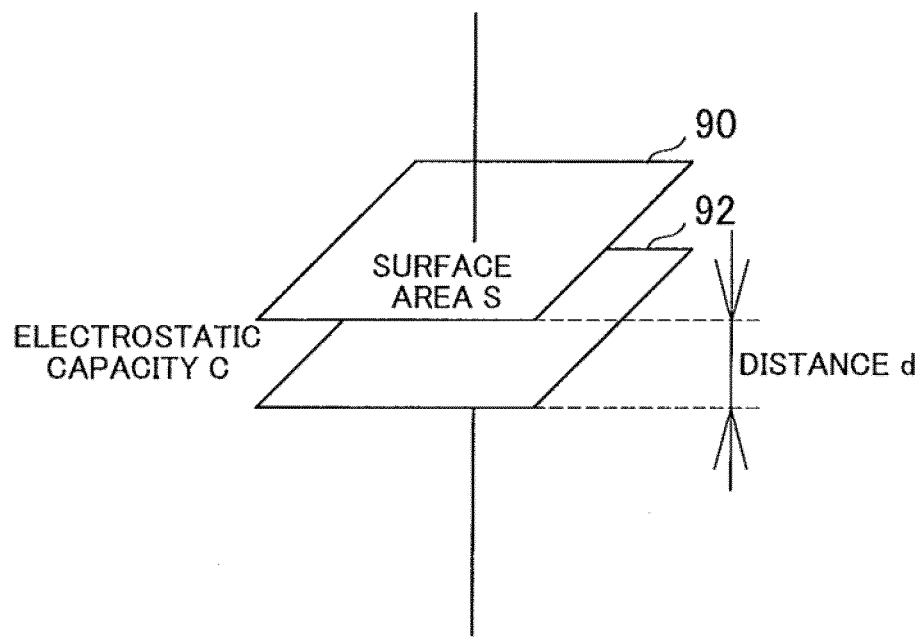
FIG. 7 is a schematic diagram showing how two electrodes are electrostatically coupled.

FIG. 7 shows how two electrodes 90 and 92 using conductors in a flat shape are electrostatically coupled. In FIG. 7, if the surface area of the two electrodes 90 and 92 is S [m$^2$] and the distance between electrodes is d [m], the electrostatic capacity C [F] generated between the electrodes is given by the following formula:

[Math 6]

$$C = \frac{\varepsilon_0 \varepsilon_r S}{d} \text{ [F]} \tag{6}$$

Here, $\varepsilon_0$ is the dielectric constant in a vacuum and $\varepsilon_0 = 8.854 \times 10^{-12}$ [F/m]. $\varepsilon_r$ is the relative dielectric constant between electrodes and can be considered, for example, in the air as $\varepsilon_r = 1$.

Figure 8:
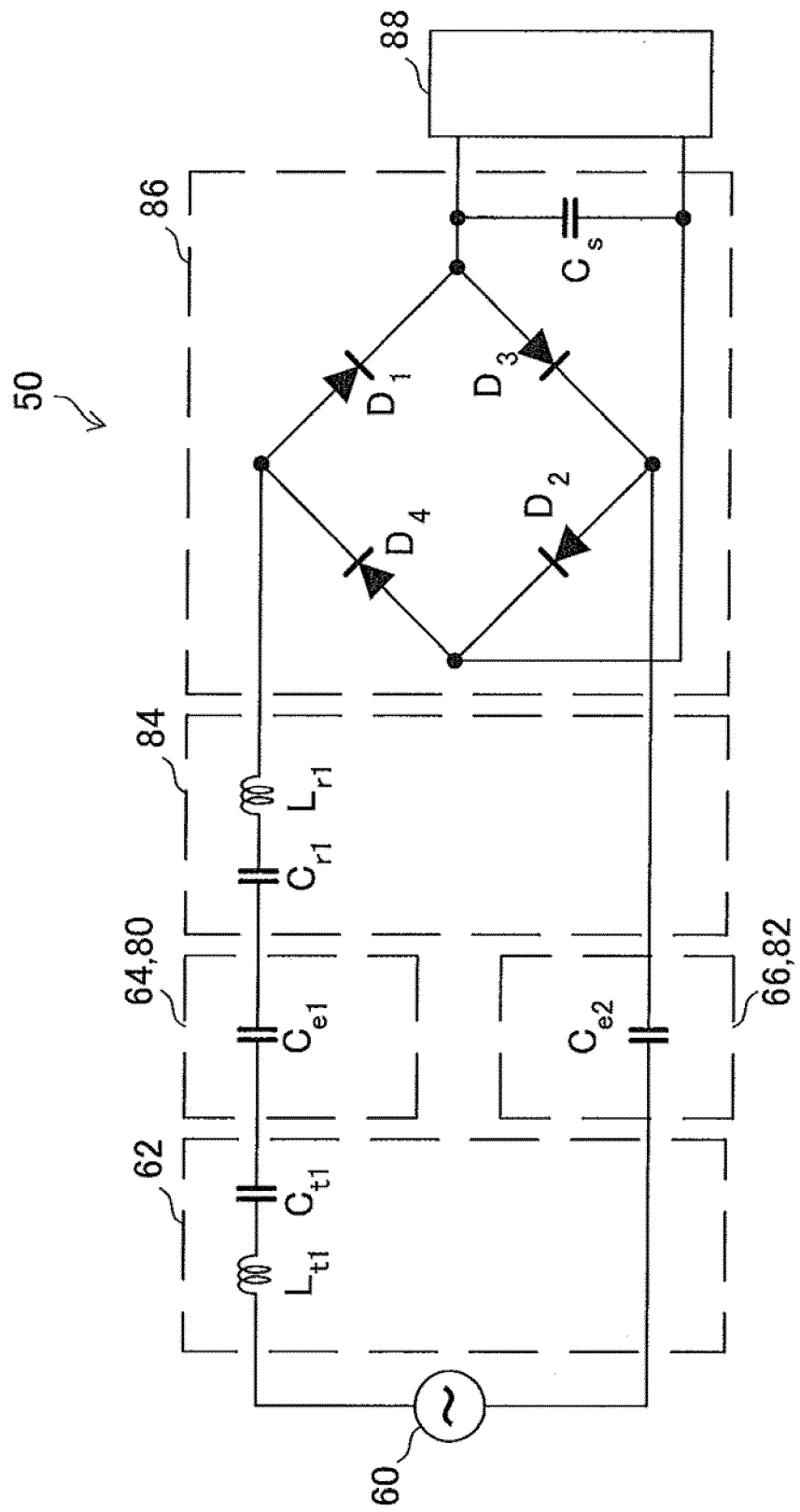
FIG. 8 is a block diagram showing an equivalent circuit of the transmission system shown in FIG. 6.

If a series resonance circuit consisting of the resonance unit 62 and the resonance unit 84 shown in FIG. 6 is assumed, the transmission system 50 can be replaced by an equivalent circuit shown in FIG. 8.

Referring to FIG. 8, the resonance unit 62 has an inductor element $L_{t1}$ and a capacitor element $C_{t1}$. The resonance unit 84 has an inductor element $L_{r1}$ and a capacitor element $C_{r1}$. The first power supplying electrode 64 has an electrostatic capacity $C_{e1}$ with the first power receiving electrode 80, and the second power supplying electrode 66 has an electrostatic capacity $C_{e2}$ with the second power receiving electrode 82.

The rectification unit 86 has diodes $D_1$ to $D_4$ as rectifying elements and a capacitor element $C_s$. An AC current output from the resonance unit 84 is converted into a pulsating current by a diode bridge formed by the diodes $D_1$ to $D_4$ and the pulsating current is smoothed by the capacitor element $C_s$ to generate DC power, which is supplied to the circuit load 88.

If the equivalent circuit of the transmission system 50 shown in FIG. 8 is focused on, the whole system can be regarded as a series resonance circuit consisting of inductor elements and capacitor elements. That is, if the inductor elements $L_{t1}$ and $L_{r1}$ are combined into a combined inductor element $L_a$, the capacitor elements $C_{t1}$, $C_{r1}$, $C_{e1}$, and $C_{e2}$ are combined into a combined capacitor element $C_a$, and the rectification unit 86 and the circuit load 88 are combined into a load component R, the equivalent circuit of the transmission system 50 can further be simplified as shown in FIG. 9.

Figure 9:
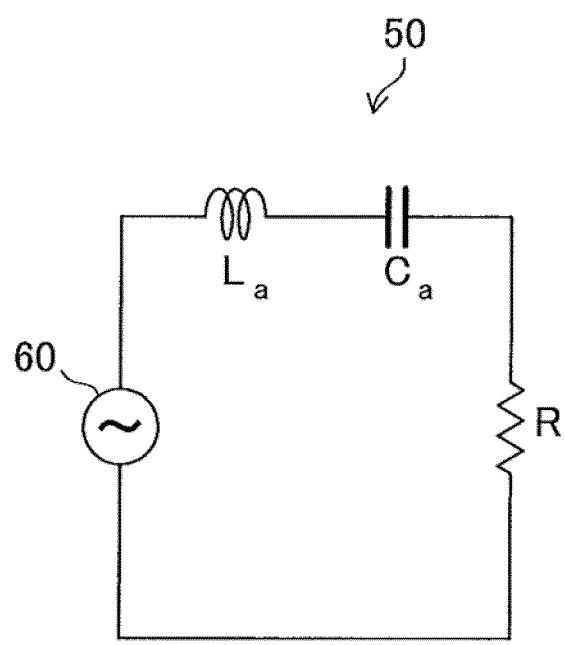
FIG. 9 is a block diagram showing an equivalent circuit of the transmission system shown in FIG. 8 in a simplified form.

The impedance of the whole circuit in FIG. 9 is given by the following formula:

[Math 7]

$$Z = R + j\left(\omega L_a - \frac{1}{\omega C_a}\right) \tag{7}$$

The magnitude of the impedance Z is derived from the above formula as given by the following formula:

[Math 8]

$$|Z| = \sqrt{R^2 + \left(\omega L_a - \frac{1}{\omega C_a}\right)^2} \quad (8)$$

Herein, $\omega=\omega_r$, that makes the magnitude $|Z|$ of the impedance Z shown in Formula (8) minimal is derived as given by the following formula:

[Math 9]

$$\omega_r = \frac{1}{\sqrt{L_a C_a}} \quad (9)$$

When $\omega=\omega_r$, the current $|I|$ flowing through the circuit becomes the maximum value $|I|_{max}$. If the voltage of the AC signal generation unit 60 is V, $|I|_{max}$ is given by the following formula:

[Math 10]

$$|I|_{max} = \frac{|V|}{R} \quad (10)$$

Figure 10:
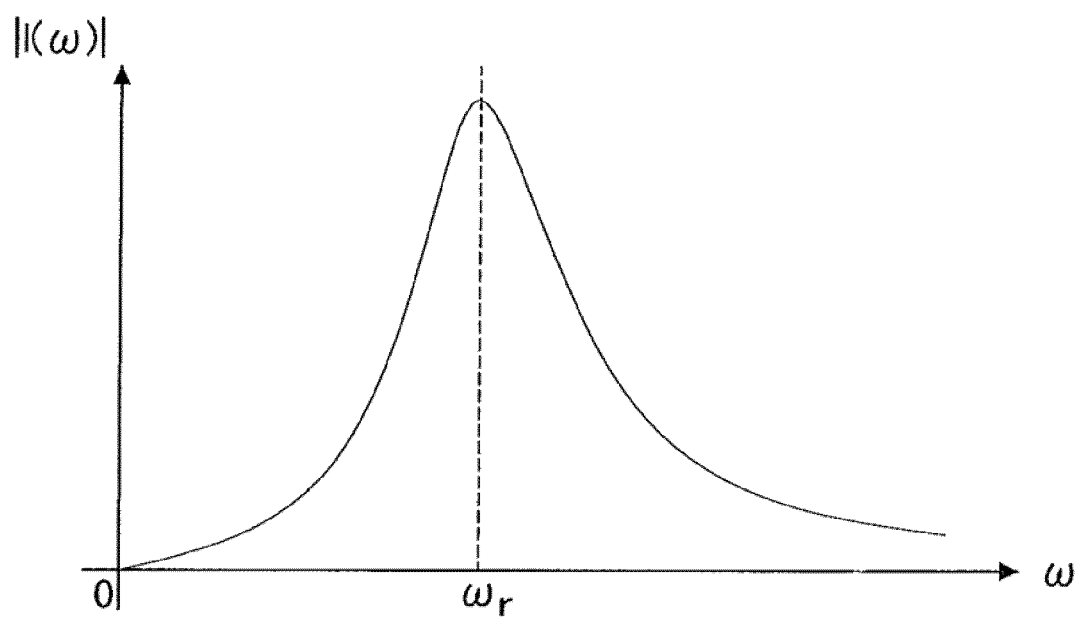
FIG. 10 is a block diagram exemplifying characteristics of the equivalent circuit shown in FIG. 9.

If the angular frequency is focused on, the current $|I(\omega)|$ flowing through the circuit as a function of the angular frequency $\omega$ shows characteristics shown in the graph in FIG. 10.

As is understood from FIG. 10, $|I(\omega)|$ shows the maximum value when $\omega=\omega_r$, and in this case, the circuit is in a resonance state. If the voltage across the combined inductor element $L_a$ is $V_L$ and that across the combined capacitor element $C_a$ is $V_C$, the following formula holds in the resonance state and the circuit seems to have pure resistance R.

[Math 11]

$$V_L = -V_C \quad (11)$$

The Q value of the circuit in FIG. 9, that is, the degree of intensity of resonance is represented by the following formula:

[Math 12]

$$Q = \left|\frac{V_L}{V}\right|_{\omega=\omega_r} = \frac{\omega_r L_a}{R} = \frac{1}{\omega_r C_a} = \frac{1}{R}\sqrt{\frac{L_a}{C_a}} \quad (12)$$

Thus, by controlling the combined inductor element $L_a$ or the combined capacitor element $C_a$ based on Formula (12) when the angular frequency of the AC signal generation unit 60 is $\omega=\omega_r$, maximum power can be supplied to the circuit load 88.

[3] First Embodiment

A transmission system 100 according to the first embodiment of the present invention will be described below with reference to FIG. 11 to FIG. 14. In the transmission system 100 according to the first embodiment, power supply is maximized by controlling an inductor element or a capacitor element of a power receiving apparatus.

Figure 11:
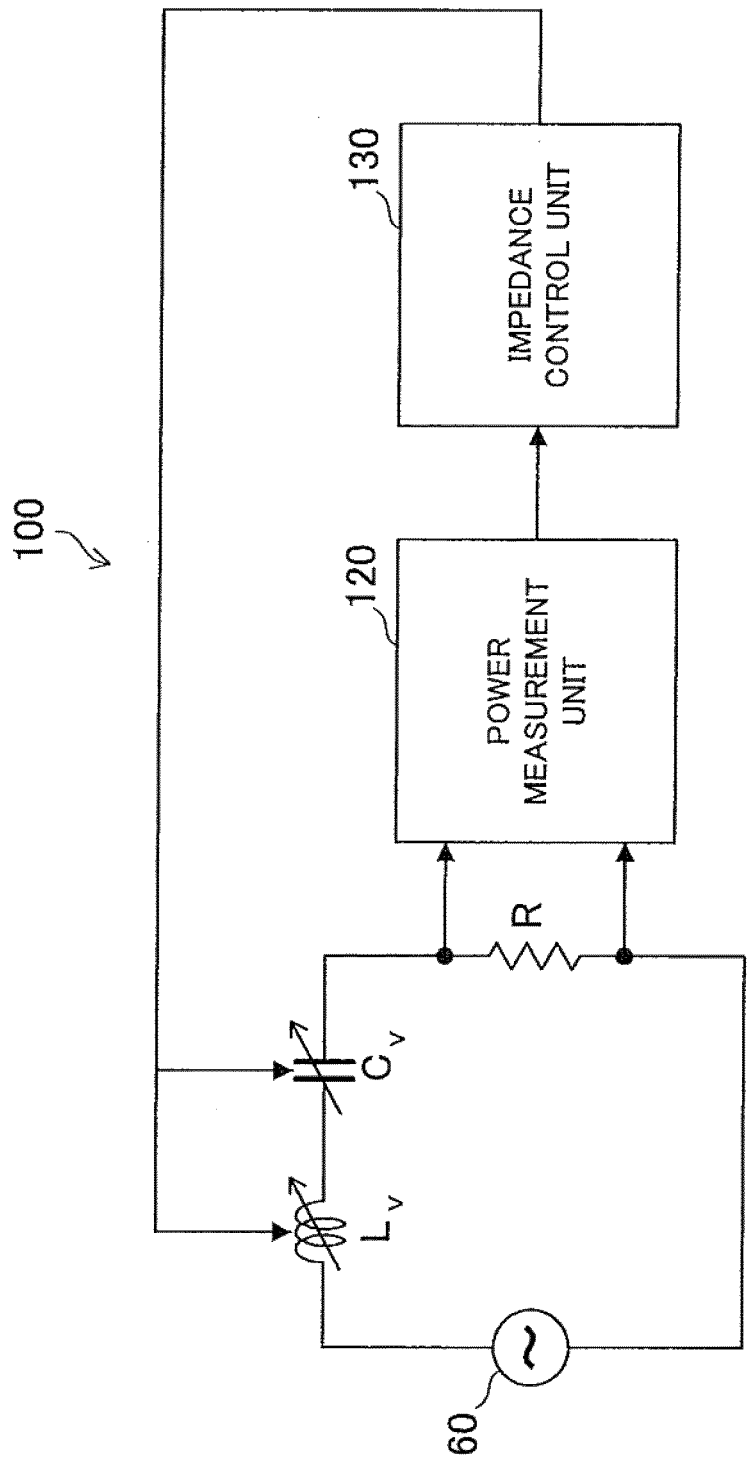
FIG. 11 is a block diagram conceptually showing a function of a transmission system according to a first embodiment.

FIG. 11 is a block diagram conceptually showing a function of the transmission system 100 according to the first embodiment. Referring to FIG. 11, the transmission system 100 includes the AC signal generation unit 60, a variable inductor $L_v$, a variable capacitance element $C_v$, a load component R, a power measurement unit 120, and an impedance control unit 130.

In the transmission system 100, the AC signal generation unit 60, the variable inductor $L_v$, the variable capacitance element $C_v$, and the load component R form a series resonance circuit similar to the equivalent circuit of the transmission system 50 shown in FIG. 8. The power measurement unit 120 is connected to both ends of the load component R. Then, the power measurement unit 120 measures the power value currently being supplied to the load component R by detecting the voltage across the load component R and outputs the measured power value to the impedance control unit 130.

The impedance control unit 130 is connected to the power measurement unit 120. The impedance control unit 130 controls one or both of the variable inductor $L_v$, which is an induction component of the transmission system 100, and the variable capacitance element $C_v$, which is a capacitance component thereof, so that the power value output from the power measurement unit 120 becomes maximum.

Figure 12A:
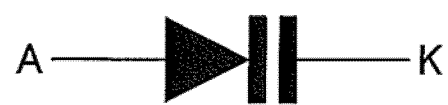
FIG. 12A is an explanatory view showing a circuit symbol of a varactor element.

A varactor element, for example, can be used as the variable capacitance element $C_v$. The varactor element is a kind of diode whose electrostatic capacity changes in accordance with the voltage applied between the input/output terminals. FIG. 12A shows a circuit symbol of a varactor element and FIG. 12B shows a characteristic curve.

Figure 12B:
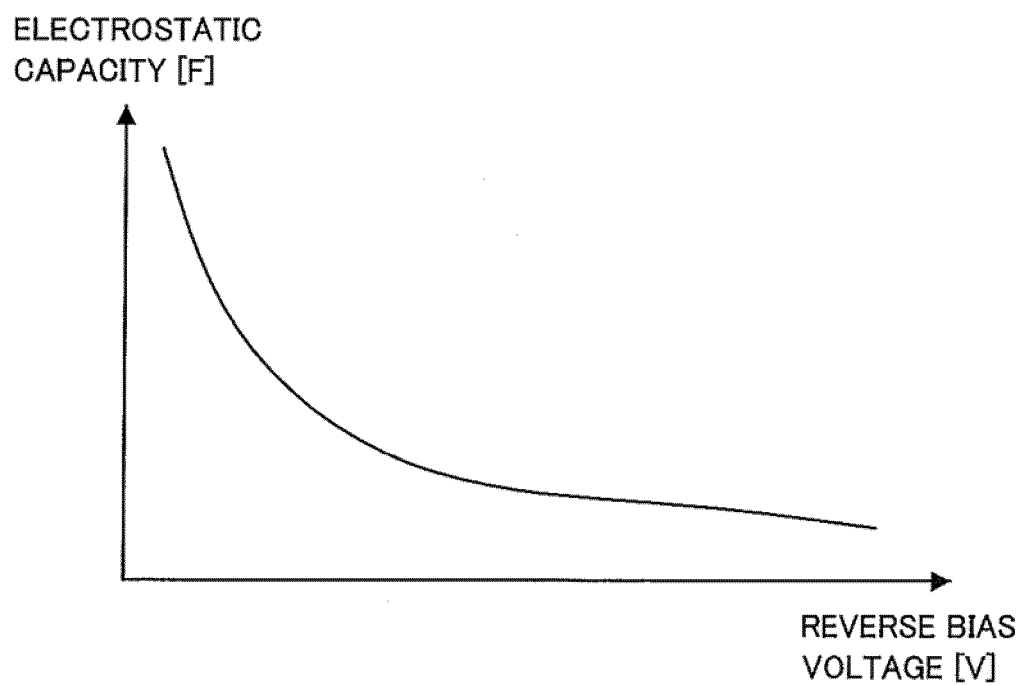
FIG. 12B is an explanatory illustration of the relationship between electrostatic capacity and reverse bias voltage.

The electrostatic capacity of a varactor element changes, by applying a higher reverse bias voltage to a terminal K on the cathode side than to a terminal A on the anode side, like a characteristic curve in FIG. 12B in accordance with the applied reverse bias voltage. By using such a varactor element as the variable capacitance element $C_v$ and controlling the voltage across the varactor element by the impedance control unit 130, for example, resonance conditions of the circuit shown in Formula (12) can be satisfied.

Figure 13:
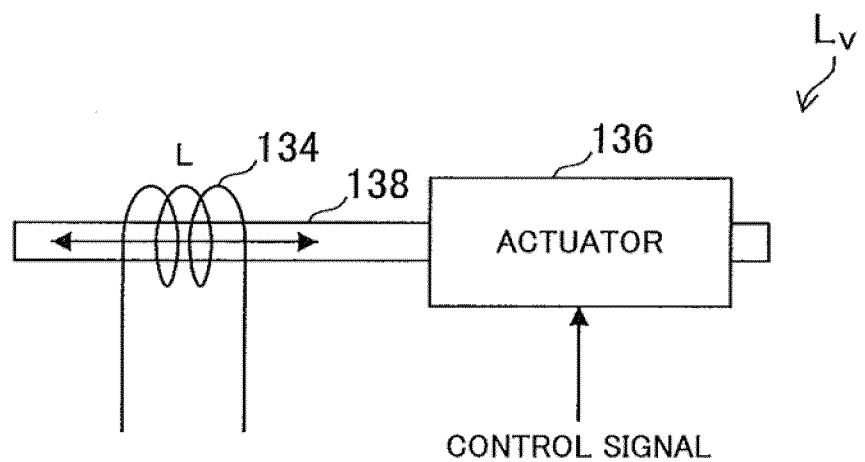
FIG. 13 is a schematic diagram exemplifying the configuration of a variable inductor.

A configuration shown in FIG. 13, for example, can be used as the variable inductor $L_v$. Referring to FIG. 13, the variable inductor $L_v$ has a coil 134, an actuator 136, and a control member 138 that is gripped by the actuator 136 in such a way that at least a portion of the coil 134 is cut through by the control member 138 and can be moved to the left and to the right. The control member 138 can be formed from a material having high permeability such as iron and ferrite.

An inductance L of the coil 134 changes depending on the amount of magnetic flux crossing over inside the coil 134. If it is assumed that the radius inside the coil 134 and that of the control member 138 are both r [m], the inductance L of the coil 134 is given by the following formula:

[Math 13]

$$L = \mu_0 \mu_r n^2 \pi r^2 \quad (13)$$

Here, $\mu_0$ is the permeability of a vacuum, $\mu_r$ is the relative permeability of the control member 138, and n is the number of times of winding the coil wound around the control member 138.

In the configuration of the variable inductor $L_v$ described above, the inductance of the coil 134 can be changed, for example, by the control member 138 being moved to the left and to the right by the actuator 136 that has received a control signal output from the impedance control unit 130.

Herein, the configuration of the variable capacitance element $C_v$ and that of the variable inductor $L_v$ are not limited to examples shown in FIG. 12A and FIG. 13 respectively. For example, a variable capacitance element that controls electrostatic capacity by changing the distance between electrodes may be used as the variable capacitance element $C_v$. For example, a variable inductor that changes coupling coefficients of a plurality of coils may be used as the variable inductor $L_v$.

In the above description of FIG. 11, a power supplying apparatus and a power receiving apparatus are replaced by an equivalent series resonance circuit to describe the principle of operation of the transmission system 100. However, in reality, the transmission system 100 is configured by being separated into a power supplying apparatus and a power receiving apparatus.

Figure 14:
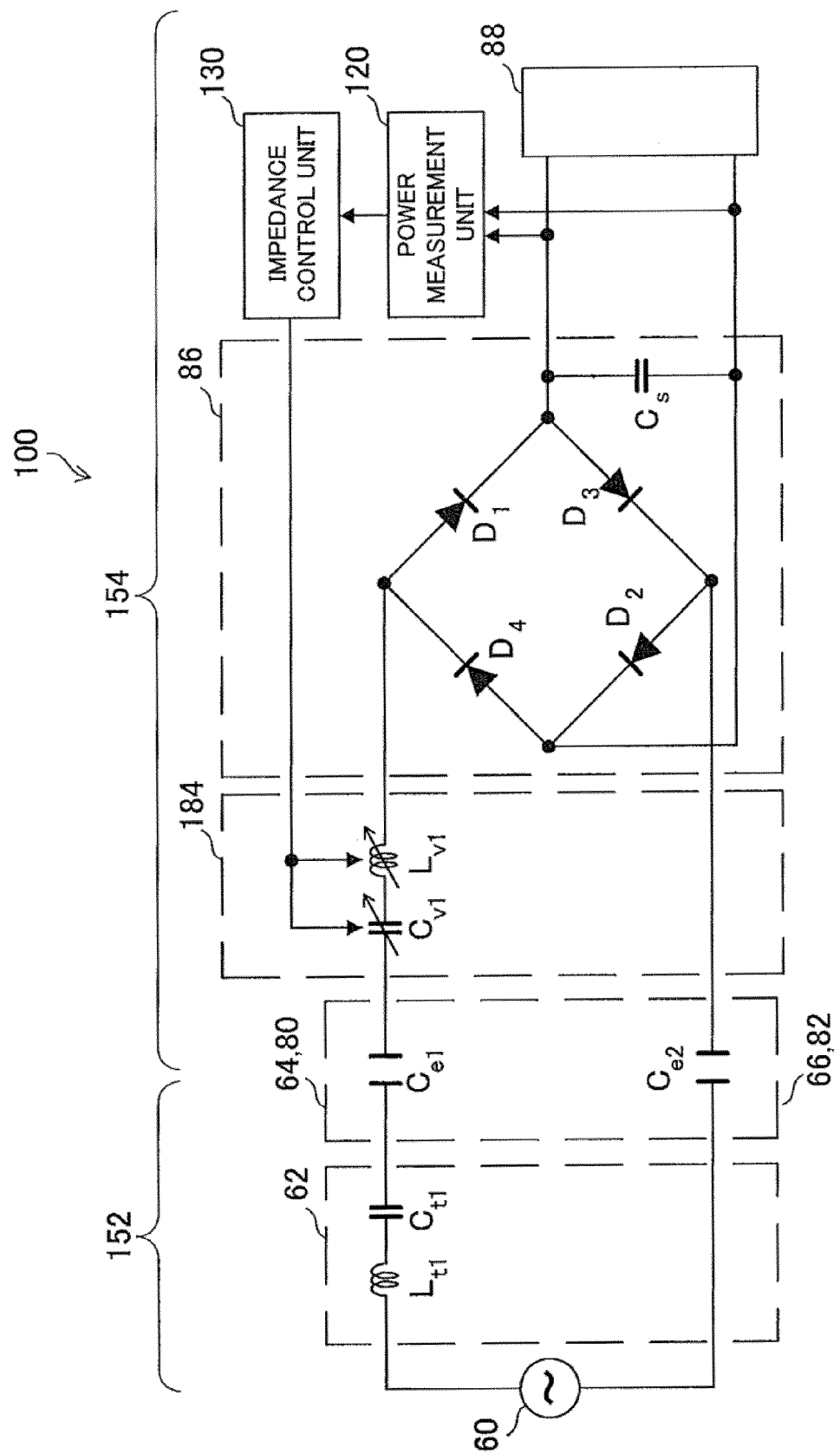
FIG. 14 is a block diagram showing the configuration of the transmission system according to the first embodiment.

FIG. 14 is a block diagram exemplifying a substantial configuration of the transmission system 100. Referring to FIG. 14, the transmission system 100 includes a power supplying apparatus 152 and a power receiving apparatus 154.

The power supplying apparatus 152 is configured in the same manner as the power supplying apparatus 52 of the transmission system 50 shown in FIG. 6.

The power receiving apparatus 154 has the first power receiving electrode 80, the second power receiving electrode 82, a resonance unit 184, the rectification unit 86, the circuit load 88, the power measurement unit 120, and the impedance control unit 130. The resonance unit 184 has a variable capacitor $C_{v1}$ and a variable inductor $L_{v1}$.

In the power receiving apparatus 154, the power measurement unit 120 measures the power value currently being supplied to the circuit load 88 by detecting the voltage across the circuit load 88 and outputs the measured power value to the impedance control unit 130.

The impedance control unit 130 maximizes the power value being supplied by controlling the voltage across the variable capacitor $C_{v1}$ using, for example, a varactor element or inductance of the variable inductor $L_{v1}$ based on the power value output from the power measurement unit 120.

The impedance control unit 130 is described in FIG. 14 so that $C_{v1}$ and $L_{v1}$ are controlled by the impedance control unit 130, but, alternatively, one of $C_{v1}$ and $L_{v1}$ may be fixed so that only the other of $C_{v1}$ and $L_{v1}$ is controlled by the impedance control unit 130. In the configuration example of the transmission system 100 shown in FIG. 14, the inductor element $L_{r1}$ and the capacitor element $C_{r1}$ of the power supplying apparatus 152 may be omitted.

In FIG. 14, an example in which the inductor element and the capacitor element held by the resonance unit 184 of the power receiving apparatus 154 are controlled is described. However, the inductor element and the capacitor element held by the resonance unit 184 of the power receiving apparatus 154 may be fixed instead so that the transmission system 100 is configured so that the inductor element and the capacitor element held by the power supplying apparatus 152 are controlled based on a supplied power value.

Up to now, the first embodiment of the present invention has been described using FIG. 11 to FIG. 14. According to the transmission system 100 in the first embodiment, the AC signal generation unit 60 of the power supplying apparatus 152 generates an AC signal, and the generated AC signal is radiated by the first power supplying electrode 64 and the second power supplying electrode 66 to the outside as a potential difference in an electrostatic field. Then, the first power receiving electrode 80 and the second power receiving electrode 82 of the power receiving apparatus 154 generate an electric signal by sensing a potential difference in an electrostatic field. Then, the rectification unit 86 rectifies the generated electric signal to generate DC power and supplies the generated DC power to the circuit load 88.

At this point, an AC signal transmitted from the power supplying apparatus 152 to the power receiving apparatus 154 resonates due to induction components and capacitance components held by the first resonance unit (the resonance unit 62 of the power supplying apparatus 152) and the second resonance unit (the resonance unit 184 of the power receiving apparatus 154). According to the above configuration, power is efficiently transmitted from the power supplying apparatus 152 to the power receiving apparatus 154 using an electrostatic field.

The power receiving apparatus 154 may further include the power measurement unit 120 that measures the power value supplied from the rectification unit 86 to the circuit load 88 and the impedance control unit 130 that controls the induction component and/or the capacitance component of the resonance unit 184 based on the power value measured by the power measurement unit 120. With the above configuration, power supplied to the circuit load 88 can be maximized by controlling the degree of resonance between the power supplying apparatus 152 and the power receiving apparatus 154.

[4] Second Embodiment

Next, a transmission system 200 according to the second embodiment of the present invention will be described with reference to FIG. 15 and FIG. 16. In the transmission system 200 according to the present embodiment, power supply is maximized by controlling the angular frequency of an AC signal generated by a power supplying apparatus.

Figure 15:
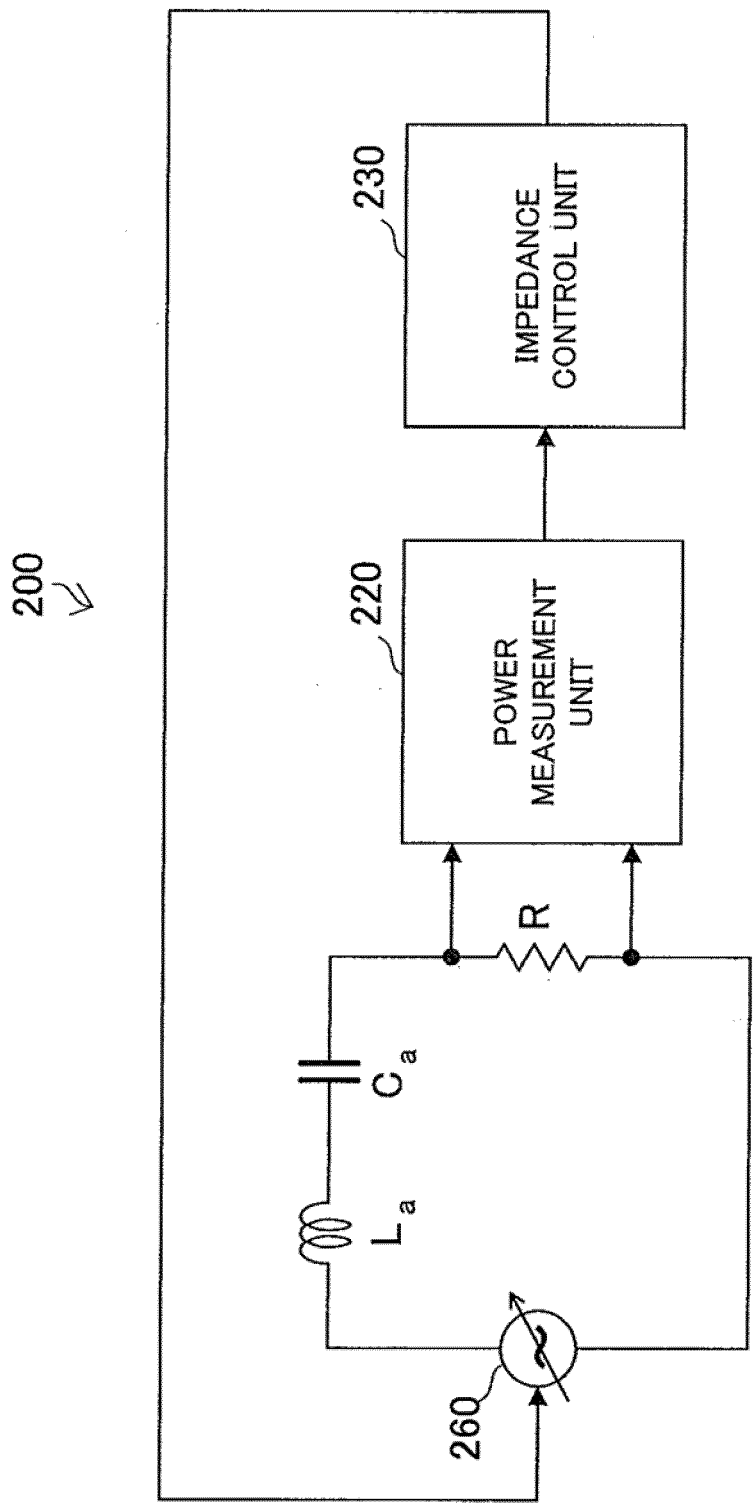
FIG. 15 is a block diagram conceptually showing the function of a transmission system according to a second embodiment.

FIG. 15 is a block diagram conceptually showing the function held by the transmission system 200 according to the second embodiment. Referring to FIG. 15, the transmission system 200 includes an inductor element $L_a$, a capacitor element $C_a$, a load component R, a power measurement unit 220, an impedance control unit 230, and an AC signal generation unit 260.

In the transmission system 200, the inductor element $L_a$, the capacitor element $C_a$, the load component R, and the AC signal generation unit 260 form a series resonance circuit similar to the equivalent circuit of the transmission system 50 shown in FIG. 8. The power measurement unit 220 is connected to both ends of the load component R. Then, the power measurement unit 220 measures the power value currently being supplied by detecting the voltage across the load component R and outputs the measured power value to the impedance control unit 230.

The impedance control unit 230 controls the angular frequency ω of an AC signal generated by the AC signal generation unit 260 so that the power value output from the power measurement unit 220 becomes maximum.

In FIG. 15, a power supplying apparatus and a power receiving apparatus are replaced by an equivalent series resonance circuit to describe the principle of operation of the transmission system 200. However, in reality, the transmission system 200 is configured by being separated into a power supplying apparatus and a power receiving apparatus.

Figure 16:
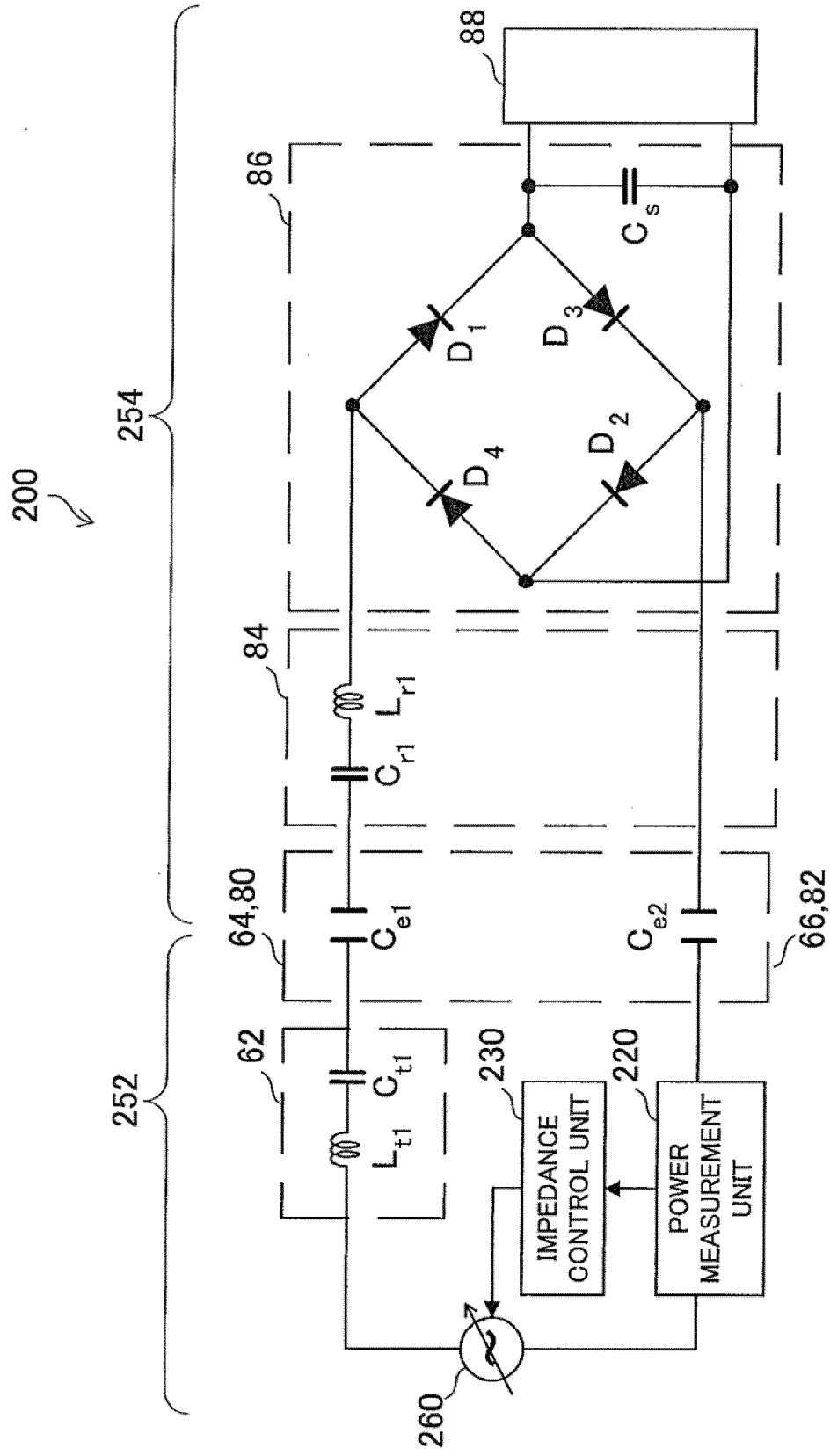
FIG. 16 is a block diagram showing the configuration of the transmission system according to the second embodiment.

FIG. 16 is a block diagram exemplifying a substantial configuration of the transmission system 200. Referring to FIG. 16, the transmission system 200 includes a power supplying apparatus 252 and a power receiving apparatus 254.

The power receiving apparatus 254 is configured in the same manner as the power receiving apparatus 54 of the transmission system 50 shown in FIG. 6. An inductor element $L_{r1}$ and a capacitor element $C_{r1}$ of the power receiving apparatus 254 may be omitted.

The power supplying apparatus 252 has the resonance unit 62, the first power supplying electrode 64, the second power supplying electrode 66, the power measurement unit 220, the impedance control unit 230, and the AC signal generation unit 260. The resonance unit 62 includes an inductor element $L_{t1}$ and a capacitor element $C_{t1}$.

The power measurement unit 220 measures the power value supplied from the power supplying apparatus 252 and outputs the measured power value to the impedance control unit 230.

The impedance control unit 230 controls the angular frequency ω of an AC signal generated by the AC signal generation unit 260 so that, for example, the current |I(ω)| shown in FIG. 10 is maximized based on the power value output from the power measurement unit 220.

Additionally, if, in the present embodiment, the power receiving apparatus 254 opposite to the power supplying apparatus 252 is not present, the load seen from the first power supplying electrode 64 and the second power supplying electrode 66 becomes extremely small and the power value detected by the power measurement unit 220 is equal to almost zero. Thus, if the power value measured by the power measurement unit 220 is smaller than a predetermined threshold, for example, operating power of an AC signal generated by the AC signal generation unit 260 may be controlled to necessary minimum power. Power saving of the transmission system 200 can thereby be achieved.

Up to now, the second embodiment of the present invention has been described using FIG. 15 and FIG. 16. According to the transmission system 200 in the present embodiment, the AC signal generation unit 260 of the power supplying apparatus 252 generates an AC signal, and the generated AC signal is radiated by the first power supplying electrode 64 and the second power supplying electrode 66 to the outside as a potential difference in an electrostatic field. Then, the first power receiving electrode 80 and the second power receiving electrode 82 of the power receiving apparatus 254 generate an electric signal by sensing a potential difference in an electrostatic field. The rectification unit 86 converts the generated electric signal into a DC signal to generate DC power and supplies the DC power to the circuit load 88.

At this point, an AC signal transmitted from the power supplying apparatus 152 to the power receiving apparatus 154 resonates due to induction components and capacitance components held by the first resonance unit (the resonance unit 62 of the power supplying apparatus 252) and the second resonance unit (the resonance unit 84 of the power receiving apparatus 254). According to the above configuration, power is efficiently transmitted from the power supplying apparatus 252 to the power receiving apparatus 254 using an electrostatic field.

The power supplying apparatus 252 further includes the power measurement unit 220 that measures the power value of an AC signal generated by the AC signal generation unit 260 and the impedance control unit 230 that controls the angular frequency ω of an AC signal generated by the AC signal generation unit 260 based on the power value measured by the power measurement unit 220. With the above configuration, power supplied to the circuit load 88 of the power receiving apparatus 254 can be maximized by controlling the degree of resonance between the power supplying apparatus 252 and the power receiving apparatus 254.

In the transmission systems 100 and 200 according to the first and second embodiments (and other transmission systems in other embodiments described later), sizes and spatial relationships of power supplying/power receiving electrodes can freely be set as long as the above resonance conditions are satisfied. That is, electrodes forming an electrostatic capacity $C_{e1}$ and an electrostatic capacity $C_{e2}$ shown in FIG. 14 or FIG. 16 may be asymmetrical to each other or one electrode may be larger than the other.

In a system to transmit power using a magnetic field, as described using FIG. 3, it is necessary for a magnetic flux to pass through a primary coil and a secondary coil in a correct orientation and constraints on the spatial relationship that does not allow such a positional deviation constitute a factor that obstructs user-friendliness of a system.

FIG. 17 is a schematic diagram conceptually showing the spatial relationship between the first power supplying electrode 64 and the first power receiving electrode 80 forming the electrostatic capacity $C_{e1}$, shown in FIG. 14 or FIG. 16 and the second power supplying electrode 66 and the second power receiving electrode 82 forming the electrostatic capacity $C_{e2}$.

In 17a of FIG. 17, the first power supplying electrode 64 and the first power receiving electrode 80 forming the electrostatic capacity $C_{e1}$ are arranged so that four corners thereof overlap one another. Also, the second power supplying electrode 66 and the second power receiving electrode 82 forming the electrostatic capacity $C_{e2}$ are arranged so that four corners thereof overlap one another.

In contrast, in 17b of FIG. 17, as a result of movement of the first power supplying electrode 64 and the second power supplying electrode 66, the opposite areas are reduced (See shaded portions). In this case, the electrostatic capacities $C_{e1}$ and $C_{e2}$ are reduced in proportion to the areas of the opposite electrodes. However, by maintaining the resonance state in a transmission state according to the first or second embodiment described above, power can still be transmitted efficiently even if a positional deviation occurs.

[5] Third Embodiment

Next, as the third embodiment, a transmission system 300 that further improves resistance to a positional deviation of a system that transmits power using an electrostatic field will be described.

Figure 18:
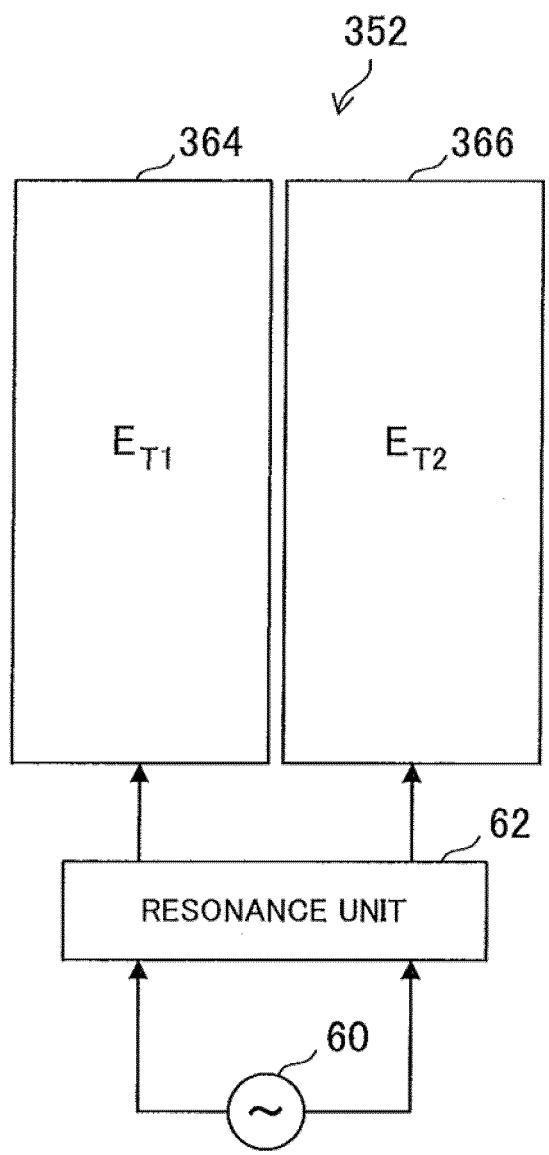
FIG. 18 is a block diagram showing the configuration of a power supplying apparatus according to a third embodiment.
Figure 19:
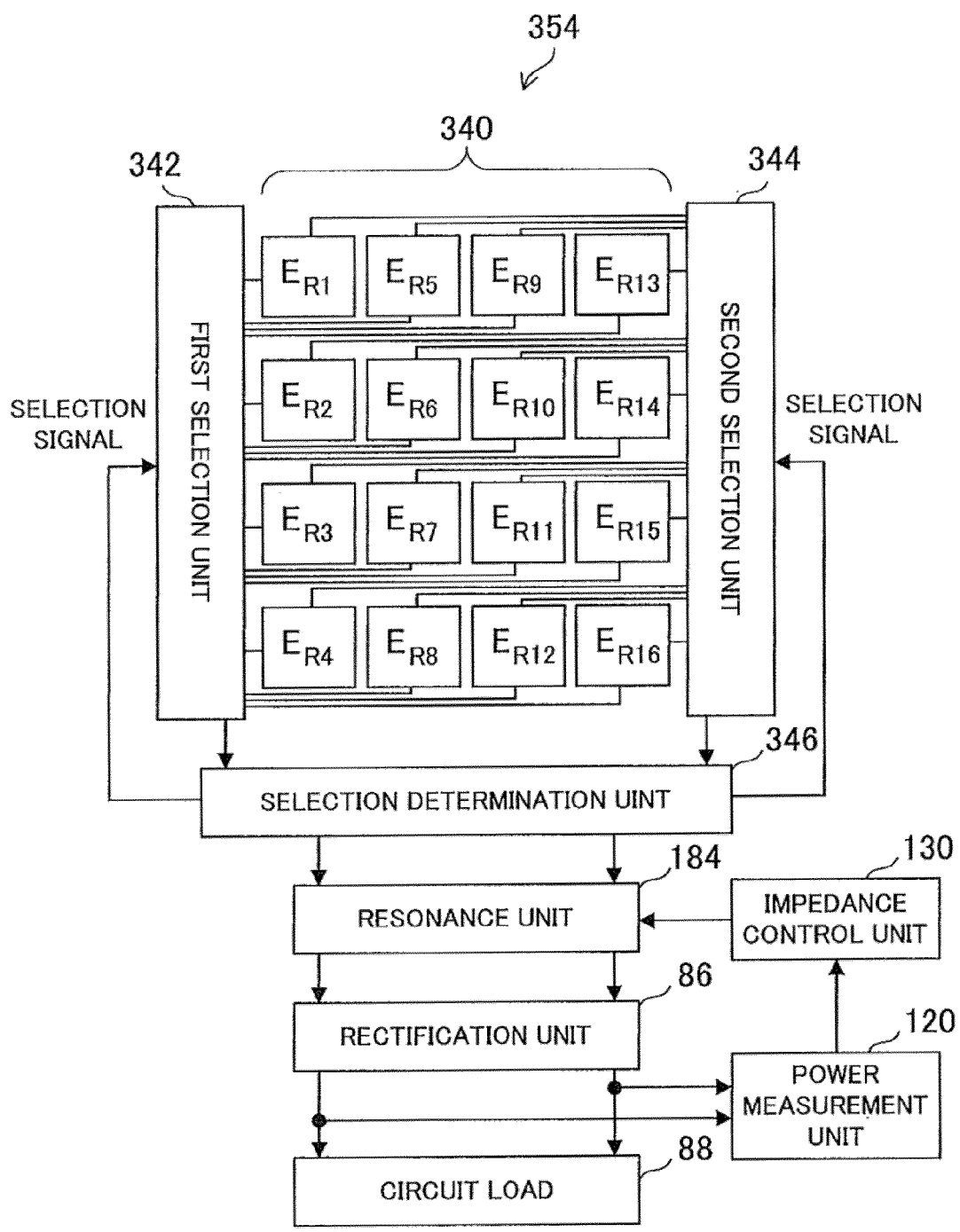
FIG. 19 is a block diagram showing the configuration of a power receiving apparatus according to the third embodiment.

The transmission system 300 according to the third embodiment of the present invention includes a power supplying apparatus 352 shown in FIG. 18 and a power receiving apparatus 354 shown in FIG. 19.

FIG. 18 is a block diagram exemplifying the configuration of the power supplying apparatus 352. Referring to FIG. 18, the power supplying apparatus 352 has the AC signal generation unit 60, the resonance unit 62, a first power supplying electrode 364, and a second power supplying electrode 366.

As described above, the AC signal generation unit 60 generates an AC signal to be a power source for transmission and sends out the AC signal to the resonance unit 62. The resonance unit 62 relays the sent AC signal to the first power supplying electrode 364 and the second power supplying electrode 366. Then, the first power supplying electrode 364 and the second power supplying electrode 366 externally radiate the AC signal as a potential difference in an electrostatic field.

FIG. 19 is a block diagram exemplifying the configuration of the power receiving apparatus 354. Referring to FIG. 19, the power receiving apparatus 354 includes a plurality of power receiving electrodes 340, a first selection unit 342, a second selection unit 344, a selection determination unit 346, the resonance unit 184, the rectification unit 86, the circuit load 88, the power measurement unit 120, and the impedance control unit 130. In the present embodiment, the power receiving electrodes 340 have, for example, 16 power receiving electrodes $E_{R1}$ to $E_{R16}$.

The power receiving electrodes $E_{R1}$ to $E_{R16}$ generate an electric signal by sensing a potential difference in an electrostatic field and output the generated electric signal to the first selection unit 342 and the second selection unit 344. The first selection unit 342 and the second selection unit 344 select the designated electrode after receiving a selection signal from the selection determination unit 346 described later and output an electric signal input from the selected electrode to the resonance unit 184 via the selection determination unit 346.

As will be described below, the selection determination unit 346 classifies the power receiving electrodes $E_{R1}$ to $E_{R16}$ into a first set and a second set depending on signal intensity of electric signals output from the power receiving electrodes $E_{R1}$ to $E_{R16}$. Then, the selection determination unit 346 outputs a selection signal designating the selection of electrodes belonging to the first set to the first selection unit 342 and that designating the selection of electrodes belonging to the second set to the second selection unit 344.

Figure 20:
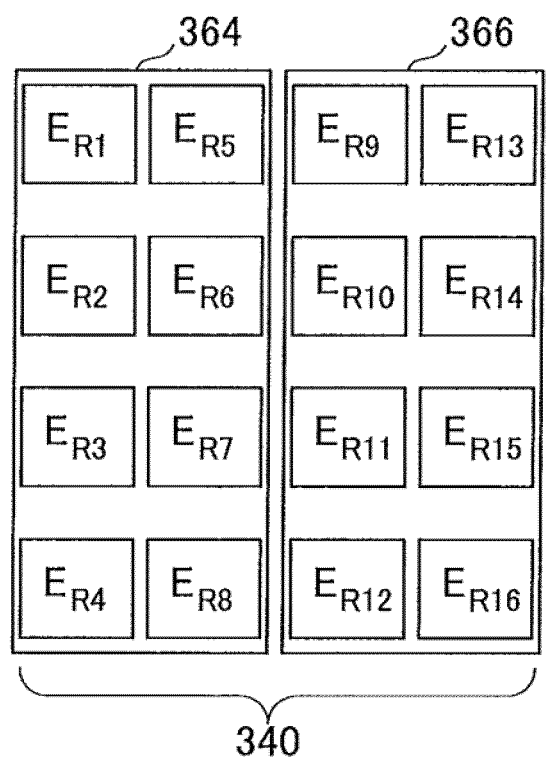
FIG. 20 is a schematic diagram showing an example of the spatial relationship between the power supplying apparatus and the power receiving apparatus.

Assume that, for example, as shown in FIG. 20, the first and second power supplying electrodes 364 and 366 of the power supplying apparatus 352 and the power receiving electrodes $E_{R1}$ to $E_{R16}$ of the power receiving apparatus 354 are overlapped. In this case, the power receiving electrodes $E_{R1}$ to $E_{R8}$ sense a potential radiated from the first supplying electrode 364, and the power receiving electrodes $E_{R9}$ to $E_{R16}$ sense a potential radiated from the second supplying electrode 366. If, for example, the potential of the power receiving electrode $E_{R1}$ is set as the reference potential, potentials of the power receiving electrodes $E_{R2}$ to $E_{R8}$ are equal to the reference potential and thus, no electric signal is output from the power receiving electrodes $E_{R2}$ to $E_{R8}$. On the other hand, potentials of the power receiving electrodes $E_{R9}$ to $E_{R16}$ correspond to a potential difference between the first supplying electrode 364 and the second supplying electrode 366, and electric signals corresponding to the potential difference are output from the power receiving electrodes $E_{R9}$ to $E_{R16}$.

The selection determination unit 346 senses such electric signals and classifies, among the power receiving electrodes $E_{R1}$ to $E_{R16}$, the power receiving electrodes $E_{R1}$ to $E_{R8}$ into the first set and the power receiving electrodes $E_{R9}$ to $E_{R16}$ into the second set. Then, the selection determination unit 346 instructs the first selection unit 342 to make a selection from the power receiving electrodes $E_{R1}$ to $E_{R8}$ belonging to the first set and the second selection unit 344 to make a selection from the power receiving electrodes $E_{R9}$ to $E_{R16}$ belonging to the second set.

Figure 21:
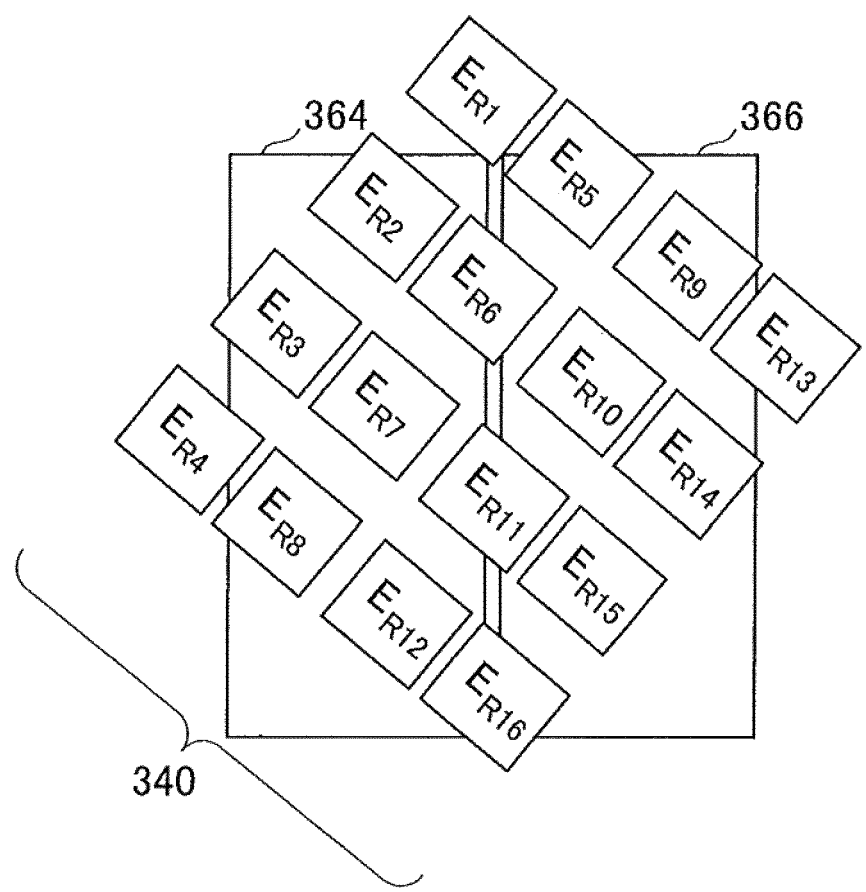
FIG. 21 is a schematic diagram showing another example of the spatial relationship between the power supplying apparatus and the power receiving apparatus.

As an example different from that in FIG. 20, assume that, for example, the first and second power supplying electrodes 364 and 366 of the power supplying apparatus 352 and the power receiving electrodes $E_{R1}$ to $E_{R16}$ of the power receiving apparatus 354 are overlapped as shown in FIG. 21. If, for example, the potential of the power receiving electrode $E_{R2}$ is set as the reference potential, like $E_{R2}$, no electric signal is output from the power receiving electrodes $E_{R3}$, $E_{R4}$, $E_{R7}$, $E_{R8}$, and $E_{R12}$ that sense the potential radiated from the first supplying electrode 364. The power receiving electrodes $E_{R6}$, $E_{R11}$, and $E_{R16}$ overlapping with an intermediate position between the first supplying electrode 364 and the second supplying electrode 366, and the power receiving electrodes $E_{R1}$, and $E_{R13}$ deviating from a position overlapping with the first supplying electrode 364 or the second supplying electrode 366 output a weak electric signal. The power receiving electrodes $E_{R5}$, $E_{R9}$, $E_{R10}$, $E_{R14}$, and $E_{R15}$ that sense a potential radiated from the second supplying electrode 366 output a strong electric signal.

The selection determination unit 346 senses such electric signals and classifies the power receiving electrodes $E_{R2}$, $E_{R3}$, $E_{R4}$, $E_{R7}$, $E_{R8}$, and $E_{R12}$ into the first set and the power receiving electrodes $E_{R5}$, $E_{R9}$, $E_{R10}$, $E_{R14}$, and $E_{R15}$ into the second set. Then, the selection determination unit 346 instructs the first selection unit 342 to make a selection from the power receiving electrodes $E_{R2}$, $E_{R3}$, $E_{R4}$, $E_{R7}$, $E_{R8}$, and $E_{R12}$ belonging to the first set and the second selection unit 344 to make a selection from the power receiving electrodes $E_{R5}$, $E_{R9}$, $E_{R10}$, $E_{R14}$, and $E_{R15}$ belonging to the second set.

Returning to the description of FIG. 19, the resonance unit 184 of the power receiving apparatus 354 resonates electric signals input from the power receiving electrodes $E_{R1}$ to $E_{R16}$ belonging to the first set or second set classified in this manner using the induction component and/or the capacitance component held by the resonance unit 184. Then, resonance by the resonance unit 184 is controlled by the power measurement unit 120 and the impedance control unit 130 following the technique described in connection with the first embodiment.

Up to now, the third embodiment of the present invention has been described using FIG. 17 to FIG. 21. According to the transmission system 300 in the third embodiment, even if a deviation occurs in the spatial relationship between the power supplying apparatus 352 and the power receiving apparatus 354, a potential difference between two power supplying electrodes of the power supplying apparatus 352 is transmitted to the resonance unit 184 of the power receiving apparatus 354 without being blunted so that power can efficiently be transmitted in the resonance state.

[6] Fourth Embodiment

In the first to third embodiments described above, examples in which at least two power supplying electrodes and two power receiving electrodes are provided have been described. However, power can also be transmitted using an electrostatic field by a pair of a power supplying electrode and a power receiving electrode opposite to each other. In that case, both conductors and the electrostatic capacity formed in a space between the conductors contribute to resonance.

Figure 22:
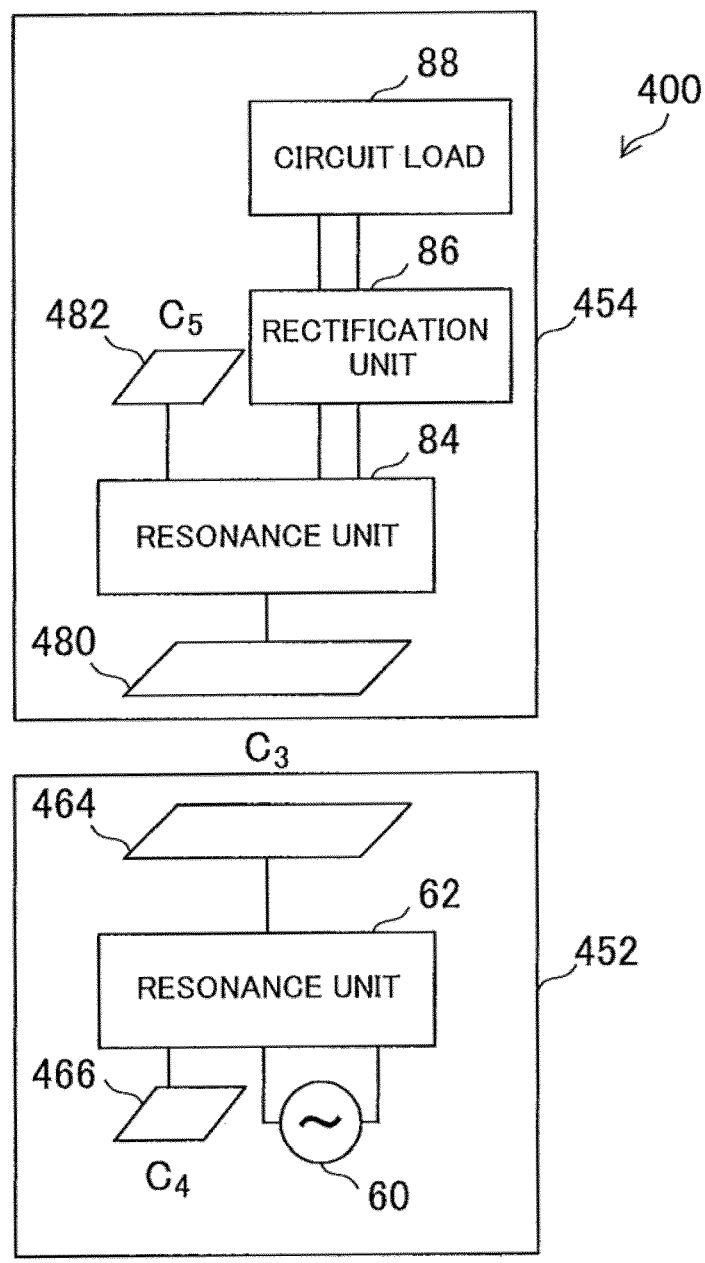
FIG. 22 is a block diagram showing the configuration of a transmission method according to a fourth embodiment.

FIG. 22 is a block diagram showing the configuration of a transmission system 400 according to the fourth embodiment of the present invention that transmits power by a pair of a power supplying electrode and a power receiving electrode opposite to each other.

Referring to FIG. 22, the transmission system 400 includes a power supplying apparatus 452 and a power receiving apparatus 454. The power supplying apparatus 452 has the AC signal generation unit 60, the resonance unit 62, a power supplying electrode 464, and a conductor 466. The power receiving apparatus 454 has a power receiving electrode 480, a conductor 482, the resonance unit 84, the rectification unit 86, and the circuit load 88.

In the transmission system 400, the power supplying electrode 464 of the power supplying apparatus 452 and the power receiving electrode 480 of the power receiving apparatus 454 are electrostatically coupled to form an electrostatic capacity $C_3$. On the other hand, the conductor 466 of the power supplying apparatus 452 and the conductor 482 of the power receiving apparatus 454 are apart from each other and thus are not strongly electrostatically coupled. Instead, the conductor 466 of the power supplying apparatus 452 is electrostatically coupled with space to form an electrostatic capacity $C_4$. Similarly, the conductor 482 of the power receiving apparatus 454 is also electrostatically coupled with space to form an electrostatic capacity $C_5$. Thus, a closed circuit as a resonance circuit like the power supplying electrode 464->the power receiving electrode 480->the resonance unit 84->the conductor 482->the conductor 466->the resonance unit 62->the power supplying electrode 464 is formed via a virtual common point, that is, space. Accordingly, power is efficiently transmitted from the power supplying apparatus 452 to the power receiving apparatus 454 using an electrostatic field.

Herein, the fourth embodiment using FIG. 22 may be combined, for example, with control of the induction component and/or the capacitance component according to the first embodiment or control of the angular frequency of an AC signal according to the second embodiment.

[7] Fifth Embodiment

In the first to fourth embodiments described above, examples in which power is transmitted from a power supplying apparatus to a power receiving apparatus have been described. Further, radio communication can be performed between a power supplying apparatus and a power receiving apparatus using a frequency that is different from that used for power transmission. By using the radio communication, for example, control of the angular frequency in a power supplying apparatus described in the second embodiment can be exercised based on information measured by a power receiving apparatus.

Figure 23:
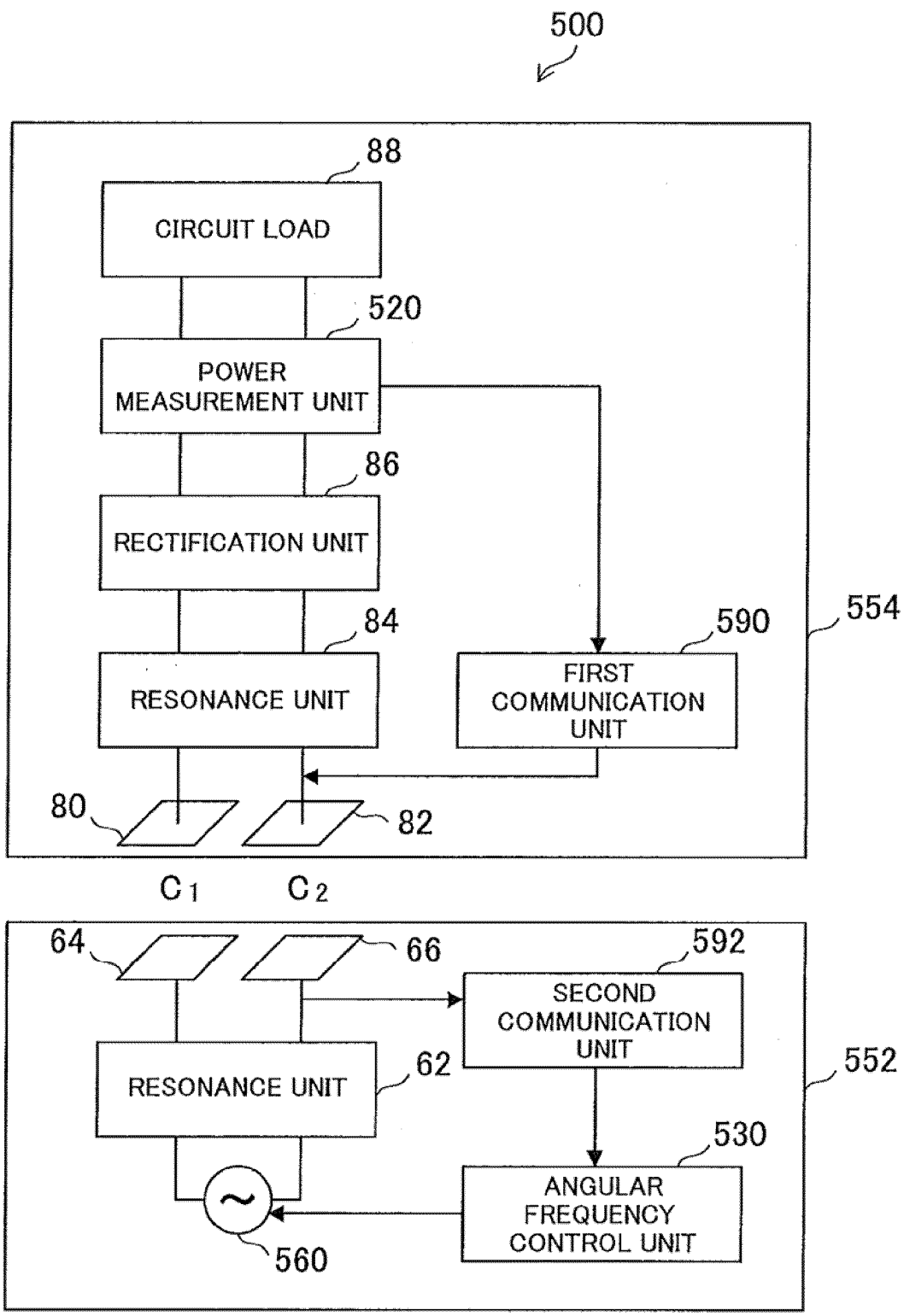
FIG. 23 is a block diagram showing the configuration of a transmission method according to a fifth embodiment.

FIG. 23 is a block diagram showing the configuration of a transmission system 500 according to the fifth embodiment of the present invention.

FIG. 23 shows that the transmission system 500 includes a power supplying apparatus 552 and a power receiving apparatus 554. The power supplying apparatus 552 has an AC signal generation unit 560, the resonance unit 62, the first power supplying electrode 64, the second power supplying electrode 66, a second communication unit 592, and an angular frequency control unit 530. The power receiving apparatus 554 has the first power receiving electrode 80, the second power receiving electrode 82, the resonance unit 84, the rectification unit 86, a power measurement unit 520, the circuit load 88, and a first communication unit 590.

In the power receiving apparatus 554, the power measurement unit 520 is connected between the rectification unit 86 and the circuit load 88. Then, the power measurement unit 520 measures the power value currently being supplied by detecting the voltage across the circuit load 88 and outputs the measured power value to the first communication unit 590.

The first communication unit 590 transmits the power value output from the power measurement unit 520 to the power supplying apparatus 552 via the second power receiving electrode 82 as a radio signal. That is, in the present embodiment, power transmitted from the power supplying apparatus 552 and a radio signal transmitted to the power supplying apparatus 552 are superimposed in the second receiving electrode 82. Herein, to prevent the radio signal from affecting power transmission, it is preferable to set a frequency $F_r$ of a radio signal transmitted to the power supplying apparatus 552 higher than a frequency $F_g$ of an AC signal transmitted from the power supplying apparatus 552 and also power of the radio signal to a sufficiently low level.

In the power supplying apparatus 552, the second communication unit 592 receives a radio signal transmitted from the power receiving apparatus 554 via the second power supplying electrode 66. The second communication unit 592 can extract only a radio signal transmitted from the power receiving apparatus 554 by using, for example, a band pass filter that allows a signal of a frequency near the frequency $F_r$ to pass. Then, the second communication unit 592 acquires the power value measured by the power measurement unit 520 of the power receiving apparatus 554 and outputs the acquired power value to the angular frequency control unit 530.

The angular frequency control unit 530 controls, like the impedance control unit 230 according to the second embodiment, the angular frequency ω of an AC signal generated by the AC signal generation unit 560 based on the power value output from the second communication unit 592 in such a way that, for example, the power value becomes maximum.

The angular frequency control unit 530 may also control the angular frequency ω of an AC signal generated by the AC signal generation unit 560 so that only necessary minimum power to operate the circuit load 88 of the power receiving apparatus 554 is supplied based on the power value output from the second communication unit 592. Accordingly, power is efficiently transmitted without surplus power being generated or transmitted.

A radio signal modulated by any modulation method such as phase shift keying, amplitude shift keying, and quadrature amplitude modulation can be used as a radio signal transmitted/received between the first communication unit 590 and the second communication unit 592. Radio communication between the first communication unit 590 and the second communication unit 592 is performed using any standard specification such as IEEE802.11a, b, g, n and the like.

[8] Sixth Embodiment

In the fifth embodiment, an example in which both a power supplying apparatus and a power receiving apparatus support both power transmission and radio communication has been described. Herein, for example, a power receiving apparatus that can operate even if a power supplying apparatus does not have a mechanism of power transmission may also be realized by installing an auxiliary power supply in the power receiving apparatus.

Figure 24:
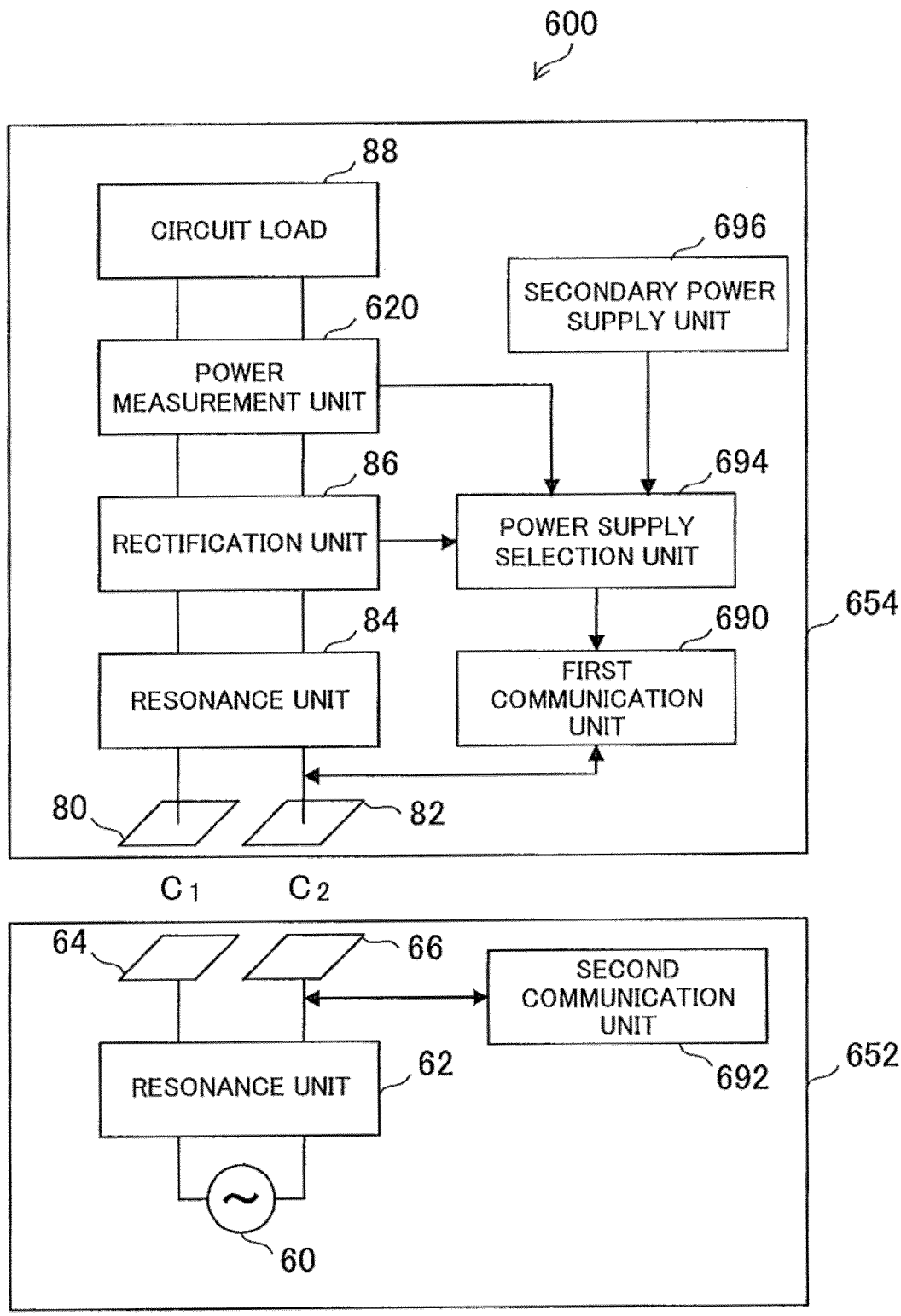
FIG. 24 is a block diagram showing a first configuration example of a transmission method according to a sixth embodiment.
Figure 25:
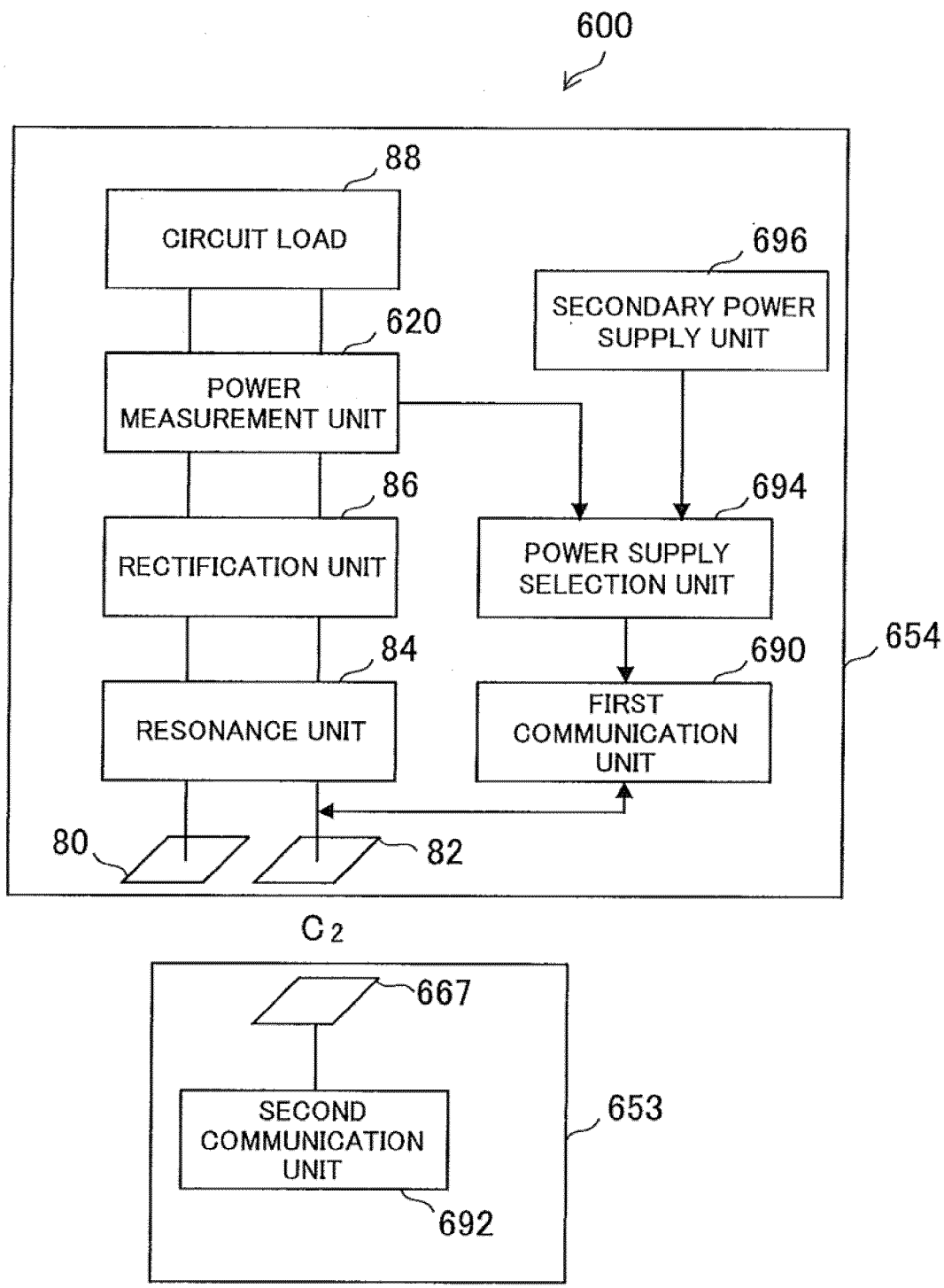
FIG. 25 is a block diagram showing a second configuration example of the transmission method according to the sixth embodiment.
Figure 26:
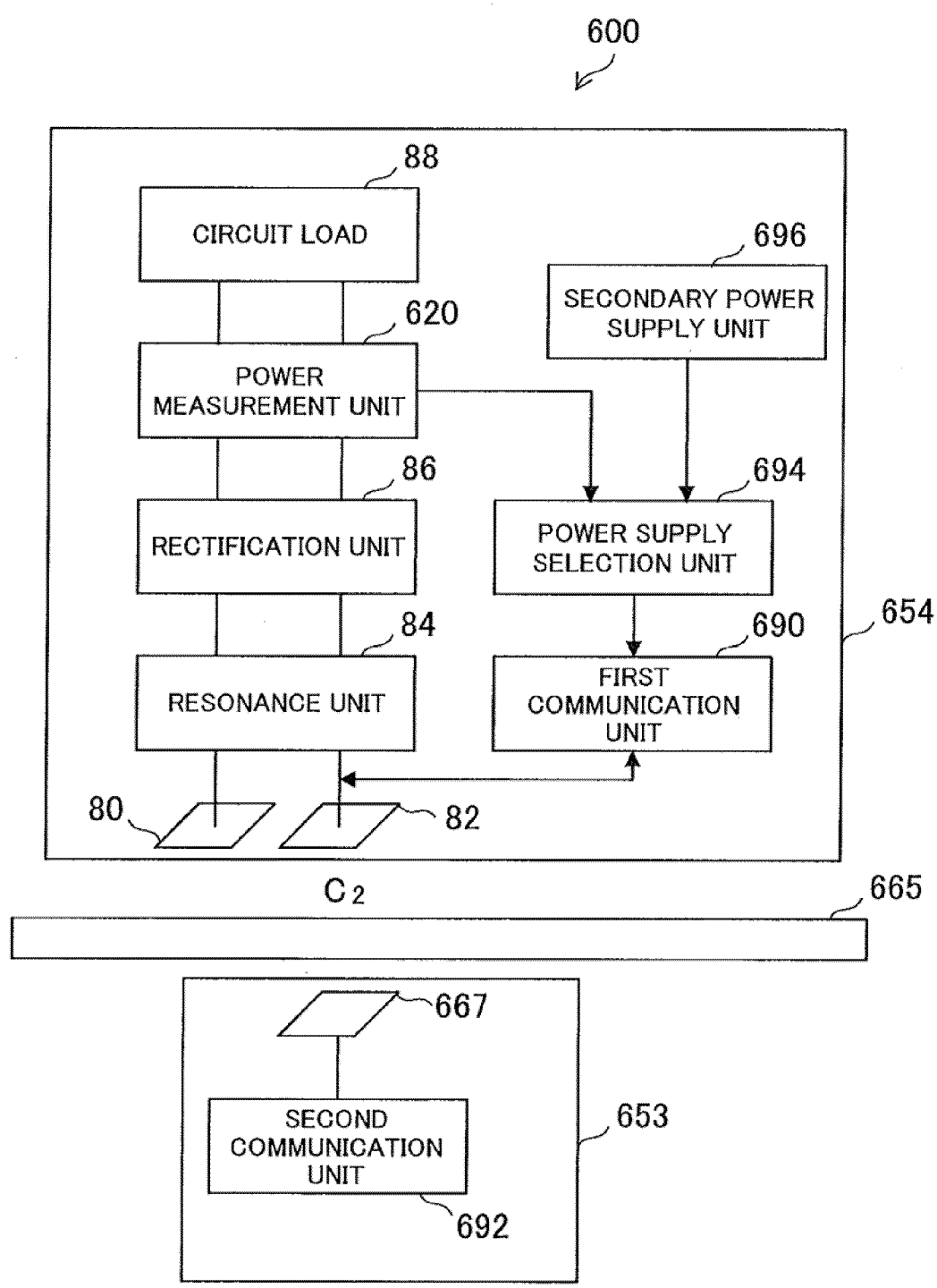
FIG. 26 is a block diagram showing a third configuration example of the transmission method according to the sixth embodiment.

FIG. 24 to FIG. 26 are block diagrams showing configuration examples of a transmission system 600 according to the sixth embodiment of the present invention.

Referring to FIG. 24, the transmission system 600 includes a power supplying apparatus 652 and a power receiving apparatus 654. The power supplying apparatus 652 has the AC signal generation unit 60, the resonance unit 62, the first power supplying electrode 64, the second power supplying electrode 66, and a second communication unit 692. The power receiving apparatus 654 has the first power receiving electrode 80, the second power receiving electrode 82, the resonance unit 84, the rectification unit 86, a power measurement unit 620, the circuit load 88, a first communication unit 690, a power supply selection unit 694, and a secondary power unit 696.

In the transmission system 600, the first communication unit 690 of the power receiving apparatus 654 and the second communication unit 692 of the power supplying apparatus 652 perform, like the first communication unit 590 and the second communication unit 592 according to the fifth embodiment, perform radio communication via the second power receiving electrode 82 and the second power supplying electrode 66.

The power measurement unit 620 measures the power value currently supplied by detecting the voltage across the circuit load 88 and outputs the measured power value to the power supply selection unit 694.

The power supply selection unit 694 is connected to the rectification unit 86 and the secondary power unit 696 to cause one of the rectification unit 86 and the secondary power unit 696 to supply power to the first communication unit 690 based on the power value output from the power measurement unit 620. If, for example, the power value measured by the power measurement unit 620 is larger than a predetermined threshold, the power supply selection unit 694 causes the rectification unit 86 to supply DC power generated by the rectification unit 86 to the first communication unit 690. If the power value measured by the power measurement unit 620 is smaller than the predetermined threshold, the power supply selection unit 694 causes the secondary power unit 696 to supply power to the first communication unit 690.

The secondary power unit 696 is connected to the power supply selection unit 694. Power from the secondary power unit 696 is supplied to the first communication unit 690 in accordance with the selection by the power supply selection unit 694. The secondary power unit 696 may be, for example, a power unit connected to commercial power, an AC (Alternating Current) adapter, or a battery such as an accumulator or dry cell.

Referring to FIG. 25, on the other hand, the transmission system 600 includes, instead of the power supplying apparatus 652 shown in FIG. 24, a communication apparatus 653. The communication apparatus 653 includes a communication electrode 667 and the second communication unit 692.

In FIG. 25, the first communication unit 690 of the power receiving apparatus 654 and the second communication unit 692 of the communication apparatus 653 perform radio communication via the second power receiving electrode 82 and the communication electrode 667.

Referring to FIG. 26, a medium 665 is placed between the communication apparatus 653 and the power receiving apparatus 654 shown in FIG. 25. The medium 665 may be, a human body, a conductor including metal such as copper and iron, pure water, a dielectric including glass, or a complex of these substances. In the transmission system 600, the communication apparatus 653 and the power receiving apparatus 654 can mutually perform radio communication even if the medium 665 described above is placed therebetween.

In a situation shown in FIG. 25 or FIG. 26, the power value output from the power measurement unit 620 of the power receiving apparatus 654 is normally very small. In such a situation, the power value falls below the predetermined threshold and thus, power is supplied from the secondary power unit 696 to the first communication unit 690.

Up to now, the sixth embodiment of the present embodiment has been described using FIG. 24 to FIG. 26. According to the power receiving apparatus 654 in the sixth embodiment, radio communication can be performed regardless of whether an apparatus as a communication partner has the power supplying function.

It does not matter whether a sequence of processing such as control processing and selection processing described herein is realized by hardware or software. When a sequence of processing is realized by software, programs constituting software are executed using a computer incorporated into dedicated hardware or using a general-purpose computer shown, for example, in FIG. 27.

Figure 27:
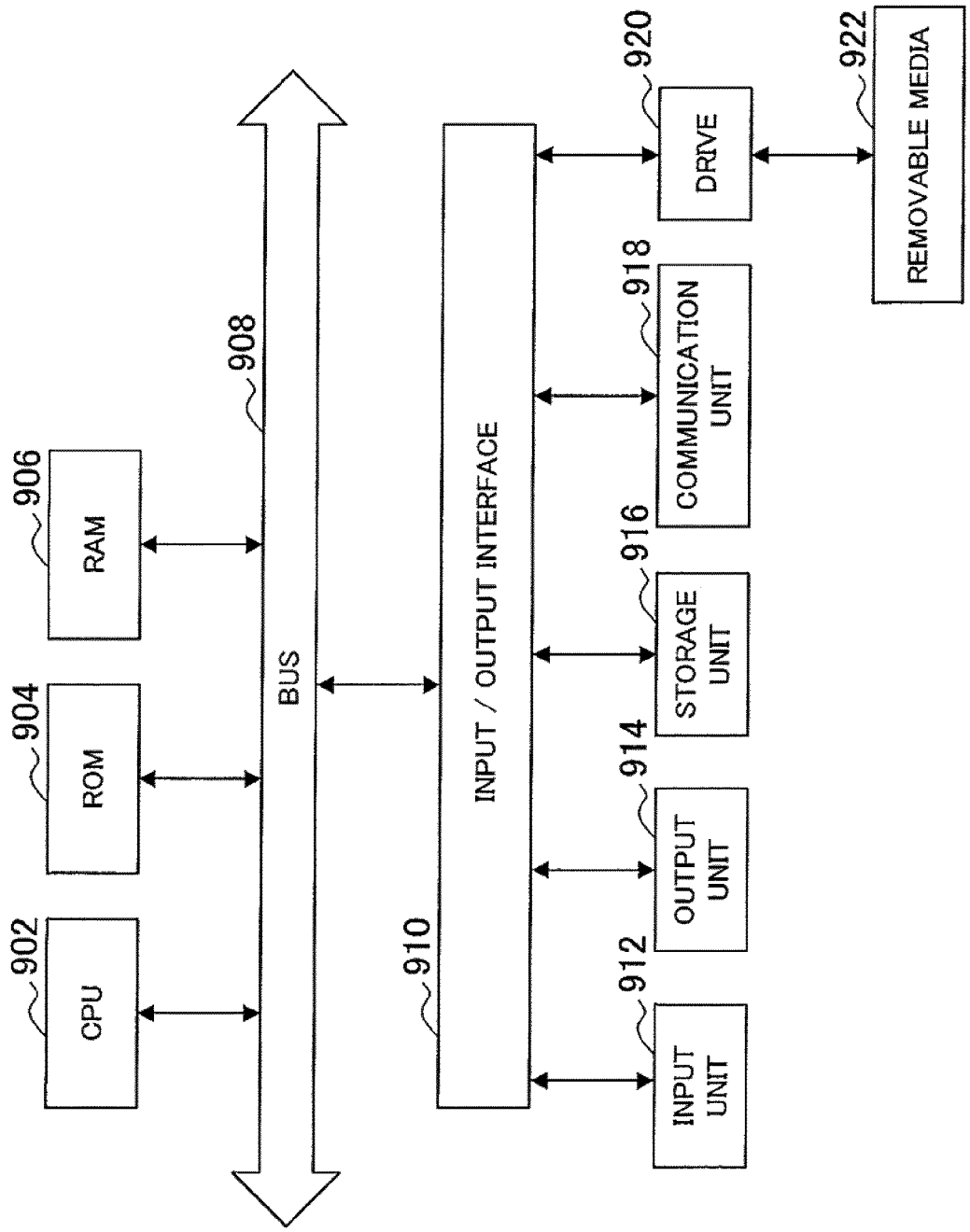
FIG. 27 is a block diagram showing a configuration example of a general-purpose computer.

In FIG. 27, a CPU (Central Processing Unit) 902 controls overall operations of a general-purpose computer. A ROM (Read Only Memory) 904 has a portion or all of programs describing a sequence of processing or data stored therein. A RAM (Random Access Memory) 906 has programs and data used by the CPU 902 for arithmetic processing and the like temporarily stored therein.

The CPU 902, the ROM 904, and the RAM 906 are mutually connected via a bus 908. An input/output interface 910 is further connected to the bus 908.

The input/output interface 910 is an interface to connect the CPU 902, the ROM 904, and the RAM 906 and an input unit 912, an output unit 914, a storage unit 916, a communication unit 918, and a drive 920.

The input unit 912 receives instructions from a user or information input via an input device such as a button, switch, lever, mouse, and keyboard. The output unit 914 outputs information to the user via a display device such as a CRT (Cathode Ray Tube), liquid crystal display, or OLED (Organic Light Emitting Diode) or via a sound output device such as a speaker.

The storage unit 916 is formed, for example, from a hard disk drive or flash memory and stores programs or program data. The communication unit 918 performs communication processing via a network such as a LAN (Local Area Network) or the Internet. The drive 920 is provided in a general-purpose computer when necessary and, for example, a removable medium 922 is inserted into the drive 920.

When a sequence of processing is performed by software, a program stored, for example, in the ROM 904, the storage unit 916, or the removable medium 922 shown in FIG. 27 is read into the RAM 906 during execution before being executed by the CPU 902.

It should be understood by those skilled in the art that various modifications, combinations, sub-combinations and alterations may occur depending on design requirements and other factors insofar as they are within the scope of the appended claims or the equivalents thereof.

For example, a power supplying electrode and a power receiving electrode are shown to have a flat shape in the first to sixth embodiments described up to now, but the power supplying electrode and the power receiving electrode do not have to have a flat shape. When a plurality of power supplying electrodes or power receiving electrodes is provided, the plurality of power supplying electrodes or power receiving electrodes does not have to necessarily be arranged in the same plane as illustrated.

The present application contains subject matter related to that disclosed in Japanese Priority Patent Application JP 2008-150911 filed in the Japan Patent Office on Jun. 9, 2008, the entire content of which is hereby incorporated by reference.

What is claimed is:

1. A transmission system, comprising:
 a power supplying apparatus, including:
  an AC signal generation unit that generates an AC signal;
  a first resonance unit that has an induction component and/or a capacitance component and resonates the AC signal generated by the AC signal generation unit; and
  a power supplying electrode that externally radiates the resonated AC signal as a potential difference in an electrostatic field, and
 a power receiving apparatus, including:
  a power receiving electrode that generates an electric signal by sensing the potential difference in the electrostatic field;
  a second resonance unit that has an induction component and/or a capacitance component and resonates the electric signal generated by the power receiving electrode;
  a rectification unit that rectifies the resonated electric signal;
  a power measurement unit that measures a power value of power generated after the electric signal rectified by the rectification unit; and
  a control unit that controls the induction component and/or the capacitance component of the second resonance unit based on the power value measured by the power measurement unit.

2. The transmission system according to claim 1, wherein the power receiving apparatus, further comprises:

a first communication unit that transmits the power value measured by the power measurement unit with a radio signal via the power receiving electrode, and the power supplying apparatus, further including:

a second communication unit that receives the power value transmitted from the power receiving apparatus via the power supplying electrode; and a control unit that controls an angular frequency of an AC signal generated by the AC signal generation unit based on the power value received by the second communication unit.

3. The transmission system according to claim 1, wherein the control unit of the power receiving apparatus controls the capacitance component of the second resonance unit by changing a voltage applied to a varactor element held by the second resonance unit.

4. The transmission system according to claim 1, wherein the control unit of the power receiving apparatus controls the induction component of the second resonance unit by moving a control member gripped so as to at least partially go through an inner position of a coil.

5. The transmission system according to claim 1, wherein the power supplying apparatus, further comprises:

a power measurement unit that measures a power value of power supplied from the power supplying apparatus; and a control unit that controls the induction component and/or the capacitance component of the first resonance unit based on the power value measured by the power measurement unit.

6. The transmission system according to claim 5, wherein the control unit of the power supplying apparatus controls the capacitance component of the first resonance unit by changing a voltage applied to a varactor element held by the first resonance unit.

7. The transmission system according to claim 5, wherein the control unit of the power supplying apparatus controls the induction component of the first resonance unit by moving a control member gripped so as to at least partially go through an inner position of a coil.

8. The transmission system according to claim 1, wherein the power supplying apparatus, further comprises:

a power measurement unit that measures a power value of power supplied from the power supplying apparatus; and a control unit that controls an angular frequency of an AC signal generated by the AC signal generation unit based on the power value measured by the power measurement unit.

9. The transmission system according to claim 8, wherein the control unit of the power supplying apparatus lowers output of the AC signal generated by the AC signal generation unit when the power value measured by the power measurement unit is smaller than a predetermined threshold.

10. The transmission system according to claim 1, wherein the power supplying electrode and the power receiving electrode have different sizes.

11. A transmission system, comprising:

a power supplying apparatus, including:

an AC signal generation unit that generates an AC signal;

a first resonance unit that has an induction component and/or a capacitance component and resonates the AC signal generated by the AC signal generation unit; and a power supplying electrode that externally radiates the resonated AC signal as a potential difference in an electrostatic field, and a power receiving apparatus, including:

a power receiving electrode that generates an electric signal by sensing the potential difference in the electrostatic field;

a second resonance unit that has an induction component and/or a capacitance component and resonates the electric signal generated by the power receiving electrode;

a rectification unit that rectifies the resonated electric signal;

wherein the power receiving electrode includes a plurality of electrodes, and the power receiving apparatus, further comprises:

a first selection unit and a second selection unit each capable of selecting designated electrodes from the plurality of electrodes; and a selection determination unit that classifies the plurality of electrodes into a first set and a second set based on signal intensity of an electric signal output from each of the plurality of electrodes, instructs the first selection unit to make a selection of electrodes belonging to the first set, and instructs the second selection unit to make a selection of electrodes belonging to the second set.

12. A transmission system, comprising:

a power supplying apparatus, including:

an AC signal generation unit that generates an AC signal;

a first resonance unit that has an induction component and/or a capacitance component and resonates the AC signal generated by the AC signal generation unit; and a power supplying electrode that externally radiates the resonated AC signal as a potential difference in an electrostatic field, and a power receiving apparatus, including:

a power receiving electrode that generates an electric signal by sensing the potential difference in the electrostatic field;

a second resonance unit that has an induction component and/or a capacitance component and resonates the electric signal generated by the power receiving electrode;

a rectification unit that rectifies the resonated electric signal;

a first communication unit that performs radio communication with the power supplying apparatus via the power receiving electrode;

a secondary power supply unit connected to the first communication unit;

a power measurement unit that measures a power value of power generated after the electric signal rectified by the rectification unit; and a power supply selection unit that causes the rectification unit to supply power to the first communication unit when the power value measured by the power measurement unit is larger than a predetermined threshold and that causes the secondary power supply unit to supply power to the first communication unit when the power value measured by the power measurement unit is smaller than the predetermined threshold.

* * * * *